（12) United States Patent
Benson et al.

(10) Patent No.: US 12,471,858 B2
(45) Date of Patent: Nov. 18, 2025

(54) SYSTEMS AND METHODS FOR COMBINING THERMAL AND/OR OPTICAL IMAGING WITH DIGITAL RADIOGRAPHIC IMAGING

(71) Applicant: QSA Global Inc., Burlington, MA (US)

(72) Inventors: Paul Benson, Waltham, MA (US); Jason William Bourn, Stratham, NH (US); Joseph Ryan Lapinskas, Windham, NH (US)

(73) Assignee: QSA GLOBAL INC., Burlington, MA (US)

( * ) Notice: Subject to any disclaimer, the term of this patent is extended or adjusted under 35 U.S.C. 154(b) by 426 days.

(21) Appl. No.: 17/875,970

(22) Filed: Jul. 28, 2022

(65) Prior Publication Data

US 2023/0034478 A1 Feb. 2, 2023

Related U.S. Application Data

(60) Provisional application No. 63/227,707, filed on Jul. 30, 2021.

(51) Int. Cl.
*A61B 6/40* (2024.01)
*A61B 5/00* (2006.01)
(Continued)

(52) U.S. Cl.
CPC ............. *A61B 6/40* (2013.01); *A61B 5/0035* (2013.01); *A61B 6/107* (2013.01); *A61B 6/4417* (2013.01); *A61B 6/5247* (2013.01); *A61B 6/4035* (2013.01)

(58) Field of Classification Search
CPC ... A61B 5/0013; A61B 5/0035; A61B 5/0077; A61B 5/015; A61B 5/7425; A61B 6/00;
(Continued)

(56) References Cited

U.S. PATENT DOCUMENTS 11,382,582 B1 7/2022 Ruff
2011/0222652 A1* 9/2011 Tsujii .................. A61B 6/0414
378/37

(Continued)

FOREIGN PATENT DOCUMENTS

CN 107981875 5/2018
CN 107981875 A * 5/2018 ............. A61B 6/541

OTHER PUBLICATIONS

Translation of CN-107981875 (Year: 2018).*
Int'l Search Report and Written Opinion Appln No. PCT/US2022/038858 mailed Oct. 31, 2022.

*Primary Examiner* — David P Porta
*Assistant Examiner* — Soorena Kefayati
(74) *Attorney, Agent, or Firm* — McAndrews, Held & Malloy, Ltd.

(57) ABSTRACT

An example radiography scanning system includes: a radiation detector configured to generate digital images based on incident radiation; a radiation source configured to output the radiation toward the radiation detector; a thermal sensor configured to capture thermal images and having a field of view that at least partially overlaps a projection field of the radiation; and a computing device configured to: control the radiation source; receive the digital images from the radiation detector; receive the thermal images from the thermal camera; and output the digital images and the thermal images, in real-time, to a display device.

18 Claims, 16 Drawing Sheets

(51) Int. Cl.
*A61B 6/00* (2024.01)
*A61B 6/10* (2006.01)

(58) Field of Classification Search
CPC .. A61B 6/08; A61B 6/107; A61B 6/40; A61B 6/4035; A61B 6/42; A61B 6/44; A61B 6/4405; A61B 6/4417; A61B 6/4441; A61B 6/463; A61B 6/5247
See application file for complete search history.

(56) References Cited

U.S. PATENT DOCUMENTS

| | | | |
|---|---|---|---|
| 2015/0265228 A1* | 9/2015 | Kyriakou | A61B 5/14553 |
| | | | 600/431 |
| 2017/0215823 A1* | 8/2017 | Ivanov | A61B 6/545 |
| 2018/0116524 A1* | 5/2018 | Aoshima | A61B 6/4452 |
| 2019/0239834 A1* | 8/2019 | Benson | G01T 1/20 |
| 2020/0138522 A1* | 5/2020 | Tikka | A61B 6/5235 |
| 2020/0218922 A1 | 7/2020 | Chen | |
| 2021/0150704 A1* | 5/2021 | Bruening | G06T 11/00 |

* cited by examiner

SYSTEMS AND METHODS FOR COMBINING THERMAL AND/OR OPTICAL IMAGING WITH DIGITAL RADIOGRAPHIC IMAGING

BACKGROUND

This disclosure relates generally to radiography and, more particularly, to systems and methods for combining thermal and/or optical imaging with digital radiographic imaging.

SUMMARY

Systems and methods for combining thermal and/or optical imaging with digital radiographic imaging are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
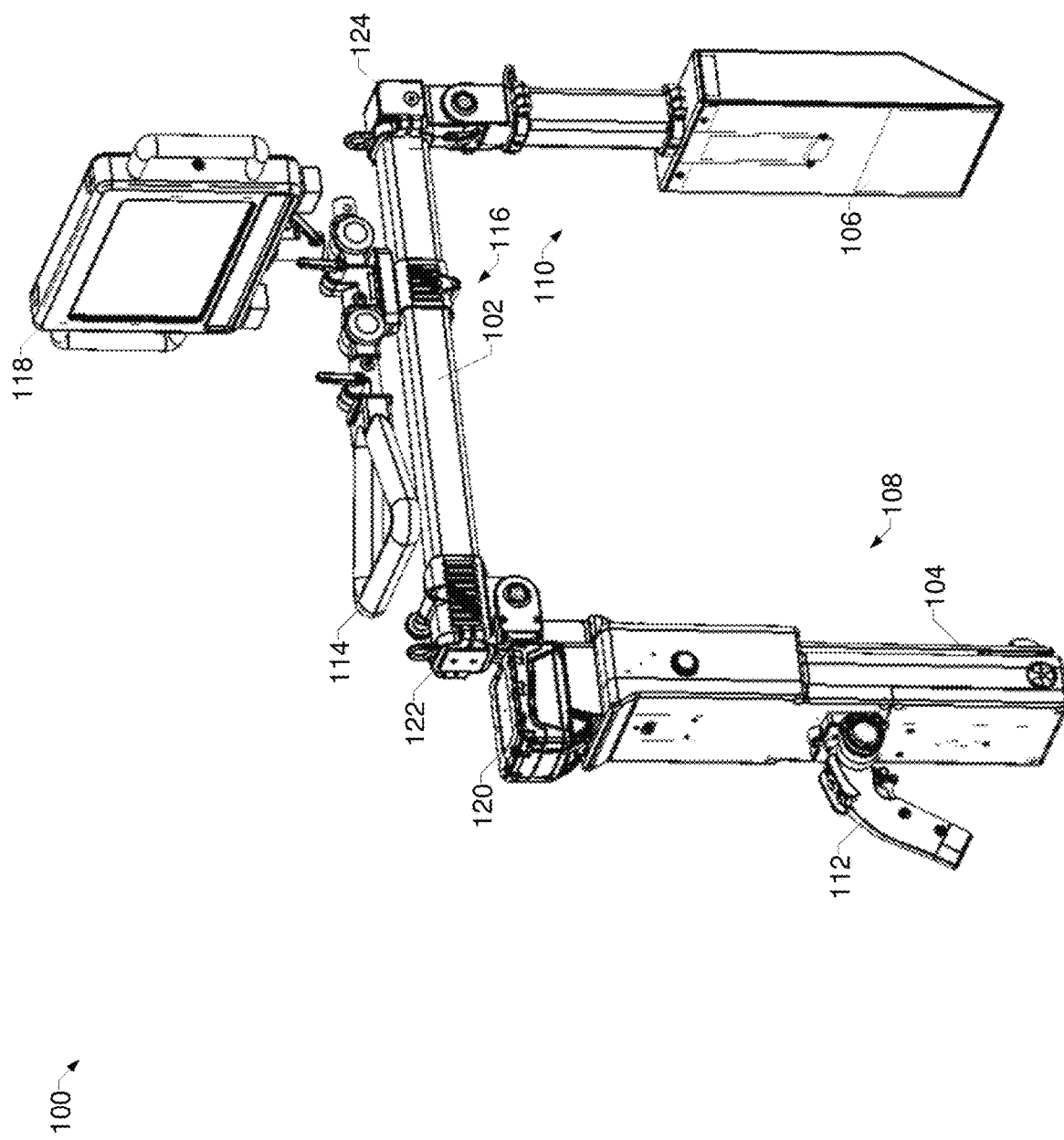
FIG. 1 is a perspective view of an example handheld X-ray imaging system to generate and output digital images and/or video based on incident X-rays, in accordance with aspects of this disclosure.

Disclosed example systems and methods provide for a digital X-ray scanning system that can provide additional context about digital X-ray images to operators and other users of the digital X-ray information. In some examples, a digital X-ray system includes an X-ray detector and an X-ray generator, as well as optical and/or thermal sensor(s) that can be synchronized to the X-ray feed. The optical and/or thermal image feeds have at least partially overlapping fields of view with the digital X-ray images, so that image(s) of interest may be displayed and/or stored with optical and/or thermal images that provide context for the digital X-ray images.

Disclosed example systems and methods may be implemented on a handheld frame (e.g., a C-frame or other arrangement), on a lift or other movable framework, on one or more robotic manipulators (e.g., pipe bugs, or motorized, wheeled buggies that move along a pipe or other structure), on one or more "drones" (e.g., quadcopters or other automatic or manually controlled flying devices), and/or any other mechanisms for holding the components of the digital X-ray scanning system in the desired arrangement for scanning.

Disclosed example systems and methods display the X-ray images with the thermal and/or optical images on a display device in real-time (e.g., as the images are generated). In some examples, the display device displays a first feed (e.g., the X-ray feed of X-ray images, the thermal feed of thermal images, or the optical feed of optical images) as primary images having a first (e.g., largest) size, and displays a second feed (e.g., another of the X-ray feed of X-ray images, the thermal feed of thermal images, or the optical feed of optical images) as secondary images having a second (e.g., smaller) size. For example, the primary images may be the main display, with the secondary images shown in or near a corner of the display so as to limit obstruction of the main display. In some such examples, the display device further displays another secondary feed (e.g., having the same size as the other secondary feed) or a tertiary feed (e.g., having an even smaller size than the secondary feed). In some examples, the two or three feeds have equivalent sizes on the display device. The operator may be permitted to select a secondary or tertiary feed to change that feed to be the primary feed, in which case the former primary feed may be relegated to be the secondary or tertiary feed.

As used herein, the term "real-time" refers to the actual time elapsed in the performance of a computation by a computing device, the result of the computation being required for the continuation of a physical process (i.e., no significant delays are introduced). For example, real-time display of captured images includes processing captured image data and displaying the resulting output images to create the perception to a user that the images are displayed immediately upon capture. As used herein, the term "portable" includes handheld (e.g., capable of being carried and operated by a single person) and/or wheeled (e.g., capable of being transported and operated while wheels are attached and/or placed on wheels).

While example systems and methods are disclosed below with reference to X-rays, the disclosure is similarly applicable to other electromagnetic energy ranges. For example, other X-ray energies, gamma rays, and/or any other types of electromagnetic radiation may be used based on the application and using with the appropriate personnel techniques and/or equipment.

Disclosed example portable radiography scanning systems include: a radiation detector configured to generate digital images based on incident radiation; a radiation source configured to output the radiation toward the radiation detector; a thermal sensor configured to capture thermal images and having a field of view that at least partially overlaps a projection field of the radiation; and a computing device configured to: control the radiation source; receive the digital images from the radiation detector; receive the thermal images from the thermal camera; and output the digital images and the thermal images, in real-time, to a display device.

Some example portable X radiography scanning systems further include an optical sensor configured to capture optical images and having a field of view that at least partially overlaps a projection field of the radiation and at least partially overlaps the field of view of the thermal camera. Some example portable X radiography scanning systems further include a display device configured to display the digital images, the thermal images, and the optical images in real-time.

In some example portable radiography scanning systems, the display device is configured to display a first one of a radiography feed of the digital images, a thermal feed of the thermal images, or an optical feed of the optical images as primary images on the display device, and display a second one of the radiography feed, the thermal feed, or the optical feed as secondary images on the display device. In some examples, the display device is configured to display a third one of the radiography feed, the thermal feed, or the optical feed as secondary images or tertiary images on the display device. In some examples, the display device is configured to, in response to a selection of the secondary images, switch the display of the selected secondary images to be displayed as primary images and switch display of the primary images to be displayed as secondary images. In some example portable radiography scanning systems, the display device is configured to display the primary images at a first size and display the secondary images at a second size, the second size being smaller than the first size.

In some example portable radiography scanning systems, the display device is communicatively coupled to the computing device via wireless communications. In some examples, the display device is communicatively coupled to the computing device via a wired connection. In some examples, the display device includes at least one of a desktop computer, a laptop computer, a smartphone, a tablet computer, a head worn display, or a display screen attached to the frame.

In some examples, the computing device is configured to store the digital images, the thermal images, and the optical images on a storage device such that the digital images, the thermal images, and the optical images are synchronized. Some example portable radiography scanning systems further include a display device configured to display the digital images and the thermal images in real-time. In some example portable radiography scanning systems, the display device is configured to display a first one of a radiography feed of the digital images or a thermal feed of the thermal images as primary images on the display device, and display a second one of the radiography feed or the thermal feed as secondary images on the display device. In some example portable radiography scanning systems, the display device is configured to, in response to a selection of the secondary images, switch the display of the selected secondary images to be displayed as primary images and switch display of the primary images to be displayed as secondary images. In some example portable radiography scanning systems, the display device is configured to display the primary images at a first size and display the secondary images at a second size, the second size being smaller than the first size. In some example portable radiography scanning systems, the computing device is configured to store the digital images and the thermal images on a storage device such that the digital images and the thermal images.

Some example portable radiography scanning systems include a frame configured to: hold the radiation detector and the computing device; hold the radiation source such that the radiation source directs the radiation to the radiation detector; and hold the thermal sensor such that the field of view of the thermal sensor at least partially overlaps the projection field of the radiation. Some example portable radiography scanning systems include an optical sensor configured to capture optical images, wherein the frame is configured to hold the optical sensor such that a field of view of the optical camera at least partially overlaps a projection field of the radiation and at least partially overlaps the field of view of the thermal sensor. In some example portable radiography scanning systems, the frame includes at least one a robotic device, a drone aircraft, or a movable support structure. In some example portable radiography scanning systems, the frame includes a first section configured to hold the radiation detector and a second section configured to hold the radiation source and hold the thermal sensor such that the field of view of the thermal sensor at least partially overlaps the projection field of the radiation, and the first section and the second section of the frame are separately manipulable.

FIG. 1 is a perspective view of an example handheld X-ray imaging system 100 to generate and output digital images and/or video based on incident X-rays. The example handheld X-ray imaging system 100 may be used to perform non-destructive testing (NDT), medical scanning, security scanning, and/or any other scanning application.

The system 100 of FIG. 1 includes a frame 102 that holds an X-ray generator 104 and an X-ray detector 106. In the example of FIG. 1, the frame 102 is C-shaped, such that the X-ray generator 104 directs X-ray radiation toward the X-ray detector 106. As described in more detail below, the frame 102 is positionable (e.g., held by an operator, supported by an external support structure and/or manipulated by the operator, etc.) around an object to be scanned with X-rays. The example frame 102 is constructed using carbon fiber and/or machined aluminum.

The X-ray generator 104 is located on a first section 108 of the C-shaped frame 102 generates and outputs X-ray radiation, which traverses and/or scatters based on the state of the object under test. The X-ray detector 106 is located on a second section 110 of the frame 102 (e.g., opposite the first section 108) and receives incident radiation generated by the X-ray generator 104.

The example frame 102 may be manipulated using one or more handles 112, 114. A first one of the handles 112 is an operator control handle, and enables an operator to both mechanically manipulate the frame 102 and control the operation of the handheld X-ray imaging system 100. A second one of the handles 114 is adjustable and may be secured to provide the operator with leverage to manipulate the frame 102. The example handle 114 may be oriented with multiple degrees of freedom and/or adjusted along a length of a central section 116 of the frame 102.

During operation, the handheld X-ray imaging system 100 generates digital images (e.g., digital video and/or digital still images) from the X-ray radiation. The handheld X-ray imaging system 100 may store the digital images on one or more storage devices, display the digital images on a display device 118, and/or transmit the digital images to a remote receiver. The example display device 118 is attachable to the example frame 102 and/or may be oriented for viewing by the operator. The display device 118 may also be detached from the frame 102. When detached, the display device 118 receives the digital images (e.g., still images and/or video) via a wireless data connection. When attached, the display device 118 may receive the digital images via a wired connection and/or a wireless connection.

A power supply 120, such as a detachable battery, is attached to the frame 102 and provides power to the X-ray generator 104, the X-ray detector 106, and/or other circuitry of the handheld X-ray imaging system 100. An example power supply 120 that may be used is a lithium-ion battery pack. The display device 118 may receive power from the power supply 120 and/or from another power source such as an internal battery of the display device 118.

The example central section 116 of the frame 102 is coupled to the first section 108 via a joint 122 and to the second section 110 via a joint 124. The example joints 122, 124 are hollow to facilitate routing of cabling between the sections 108, 110, 116. The joints 122, 124 enable the first section 108 and the second section 110 to be folded toward the center section to further improve the compactness of the handheld X-ray imaging system 100 when not in use (e.g., during storage and/or travel).

Figure 2A:
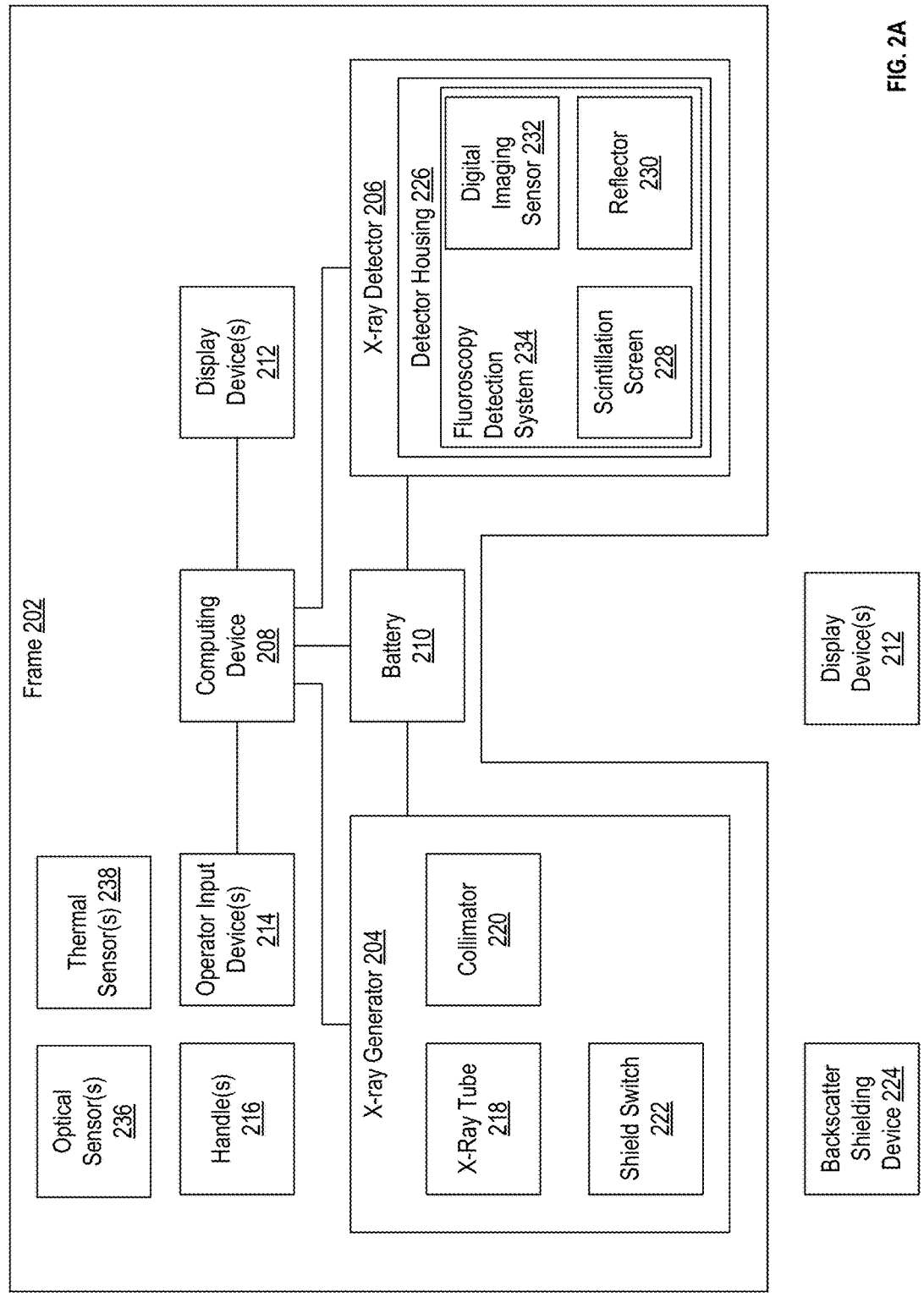
FIG. 2A is a block diagram of the example handheld X-ray imaging system of FIG. 1.

FIG. 2A is a block diagram of an example digital X-ray imaging system 200 that may be used to implement the handheld X-ray imaging system 100 of FIG. 1. The example digital X-ray imaging system 200 of FIG. 2A includes a frame 202 holding an X-ray generator 204, an X-ray detector 206, a computing device 208, a battery 210, one or more display device(s) 212, one or more operator input device(s) 214, and one or more handle(s) 216.

The X-ray generator 204 includes an X-ray tube 218, a collimator 220, and a shield switch 222. The X-ray tube 218 generates X-rays when energized. In some examples, the X-ray tube 218 operates at voltages between 40 kV and 120 kV. In combination with a shielding device, X-ray tube voltages between 70 kV and 120 kV may be used while staying within acceptable X-ray dosage limits for the operator. Other voltage ranges may also be used.

The collimator 220 filters the X-ray radiation output by the X-ray tube 218 to more narrowly direct the X-ray radiation at the X-ray detector 206 and any intervening objects. The collimator 220 reduces the X-ray dose to the operator of the system 200, reduces undesired X-ray energies to the detector 206 resulting from X-ray scattering, and/or improves the resulting digital image generated at the X-ray detector 206.

The shield switch 222 selectively enables and/or disables the X-ray tube 218 based on whether a backscatter shielding device 224 is attached to the frame. The backscatter shielding device 224 reduces the dose to the operator holding the frame 202 by providing shielding between the collimator 220 and an object under test. The example backscatter shielding device 224 includes a switch trigger configured to trigger the shield switch 222 when properly installed. For example, the shield switch 222 may be a reed switch or similar magnetically-triggered switch, and the backscatter shielding device 224 includes a magnet. The reed switch and magnet are respectively positioned on the frame 202 and the backscatter shielding device 224 such that the magnet triggers the reed switch when the backscatter shielding device 224 is attached to the frame 202. The shield switch 222 may include any type of a capacitive sensor, an inductive sensor, a magnetic sensor, an optical sensor, and/or any other type of proximity sensor.

The shield switch 222 is configured to disable the X-ray tube 218 when the backscatter shielding device 224 is not installed. The shield switch 222 may be implemented using, for example, hardware circuitry and/or via software executed by the computing device 208. In some examples, the computing device 208 may selectively override the shield switch 222 to permit operation of the X-ray tube 218 when the backscatter shielding device 224 is not installed. The override may be controlled by an administrator or other authorized user.

The X-ray detector 206 of FIG. 2A generates digital images based on incident X-ray radiation (e.g., generated by the X-ray tube 218 and directed toward the X-ray detector 206 by the collimator 220). The example X-ray detector 206 includes a detector housing 226, which holds a scintillation screen 228, a reflector 230, and a digital imaging sensor 232. The scintillation screen 228, the reflector 230, and the digital imaging sensor 232 are components of a fluoroscopy detection system 234. The example fluoroscopy detection system 234 is configured so that the digital imaging sensor 232 (e.g., a camera, a sensor chip, etc.) receives the image indirectly via the scintillation screen 228 and the reflector 230. In other examples, the fluoroscopy detection system 234 includes a sensor panel (e.g., a CCD panel, a CMOS panel, etc.) configured to receive the X-rays directly, and to generate the digital images. An example implementation of the X-ray detector 206 is described below with reference to FIGS. 5-8.

In some other examples, the scintillation screen 228, may be replaced with a solid state panel that is coupled to the scintillation screen 228 and has pixels that correspond to portions of the scintillation screen 228. Example solid state panels may include CMOS X-ray panels and/or CCD X-ray panels.

In addition to the digital X-ray detector 206, the example digital X-ray imaging system 200 includes one or more optical sensor(s) 236 and/or thermal sensor(s) 238. The optical sensor(s) 236 capture optical (e.g., visible spectrum) images and provide the images to the computing device 208. Similarly, the thermal sensor(s) 238 capture thermal (e.g., infrared spectrum) images and provide the images to the computing device 208.

The computing device 208 controls the X-ray tube 218, receives digital images from the X-ray detector 206 (e.g., from the digital imaging sensor 232), the optical sensor(s) 236, and/or the thermal sensor(s) 238, and outputs the digital images to the display device 212. Additionally or alternatively, the computing device 208 may store digital images to a storage device. The computing device 208 may output the digital images as digital video to aid in real-time non-destructive testing and/or store digital still images.

As mentioned above, the computing device 208 may provide the digital images to the display device(s) 212 via a wired connection or a wireless connection. To this end, the computing device 208 includes wireless communication circuitry. For example, the display device(s) 212 may be detachable from the frame 202 and held separately from the frame 202 while the computing device 208 wirelessly transmits the digital images to the display device(s) 212. Additionally or alternatively, the display device(s) 212 may be implemented using a separate display or computing device. The display device(s) 212 may include a smartphone, a tablet computer, a laptop computer, a wireless monitoring device, and/or any other type of display device equipped with wired and/or wireless communications circuitry to communicate with (e.g., receive digital images from) the computing device 208.

The example display device(s) 212 display the X-ray images with the thermal and/or optical images on a display device in real-time (e.g., as the images are generated). In some examples, the display device(s) 212 display a first feed (e.g., the X-ray feed of X-ray images, the thermal feed of thermal images, or the optical feed of optical images) as primary images having a first (e.g., largest) size, and display a second feed (e.g., another of the X-ray feed of X-ray images, the thermal feed of thermal images, or the optical feed of optical images) as secondary images having a second (e.g., smaller) size. For example, the primary images may be the main display shown on the display device(s) 212, with the secondary images shown in or near a corner of the main display so as to limit obstruction of the main display. In some such examples, the display device(s) 212 further display another secondary feed (e.g., having the same size as the other secondary feed) or a tertiary feed (e.g., having an even smaller size than the secondary feed). In some examples, the two or three feeds have equivalent sizes on the display device(s) 212. The operator may be permitted to select a secondary or tertiary feed to change that feed to be the primary feed, in which case the former primary feed may be relegated to be the secondary or tertiary feed.

In some other examples, the display device(s) 212 may show two or three feeds in an overlapping manner by controlling an opacity of the image(s) in the feeds.

In some examples, the computing device 208 adds data to the digital images to assist in subsequent analysis of the digital images. Example data includes a timestamp, a date stamp, geographic data, or a scanner inclination. The example computing device 208 adds the data to the images by adding metadata to the digital image file(s) and/or by superimposing a visual representation of the data onto a portion of the digital images.

The operator input device(s) 214 enable the operator to configure and/or control the example digital X-ray imaging system 200. For example, the operator input device(s) 214 may provide input to the computing device 208, which controls operation and/or configures the settings of the digital X-ray imaging system 200. Example operator input device(s) 214 include a trigger (e.g., for controlling activation of the X-ray tube 218), buttons, switches, analog joysticks, thumbpads, trackballs, and/or any other type of user input device.

The handle(s) 216 are attached to the frame 202 and enable physical control and manipulation of the frame 202, the X-ray generator 204, and the X-ray detector 206. In some examples, one or more of the operator input device(s) 214 are implemented on the handle(s) 216 to enable a user to both physically manipulate and control operation of the digital X-ray imaging system 200.

Figure 2B:
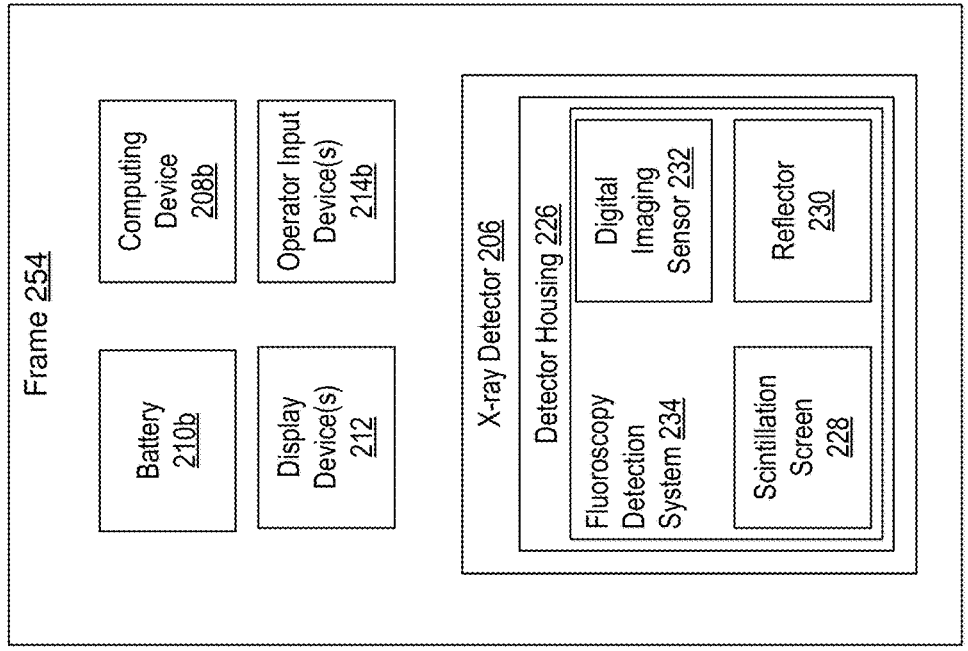
FIG. 2B illustrates another example digital X-ray imaging system having multiple frame sections.
Figure 2B:
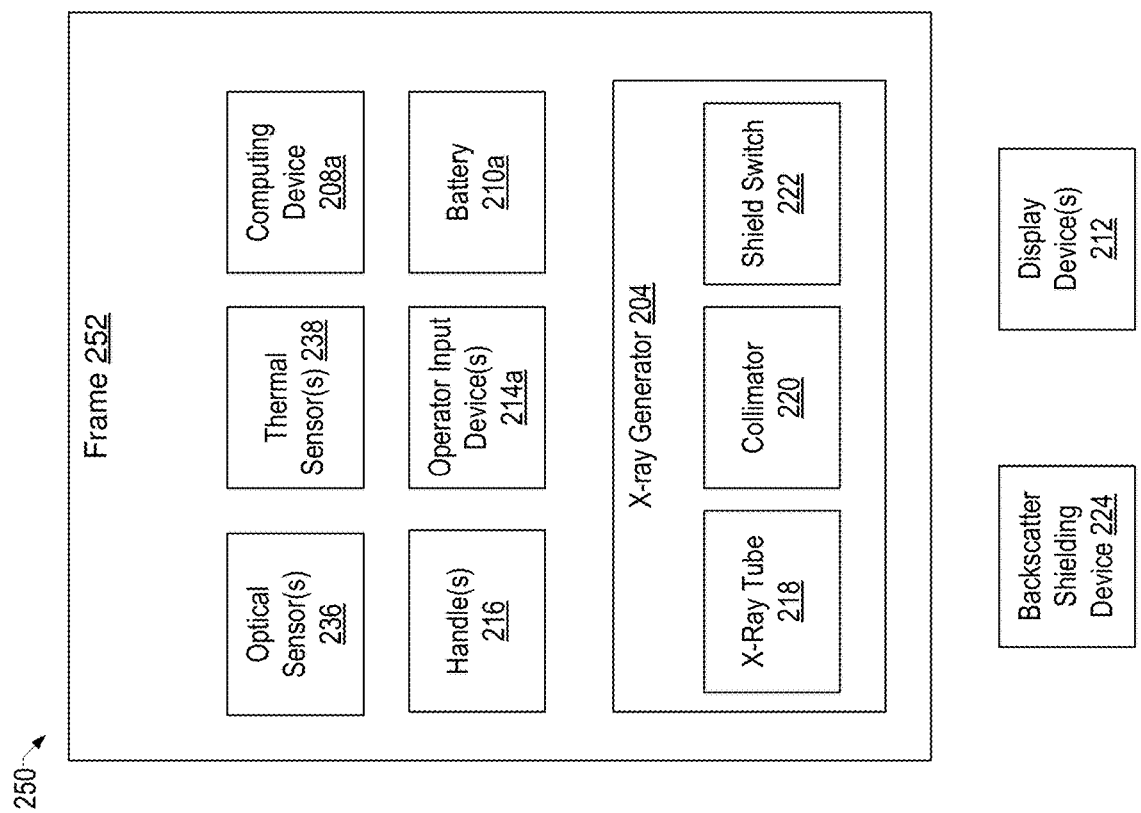

While the example frame 202 includes features to enable the digital X-ray imaging system 200 to be held and manipulated by an operator during output of the X-rays, in other examples the frame 202 includes one or more sections or portions, and/or may be implemented and/or held by one or more robotic device(s), drone aircraft (e.g., quadcopters or other remote-controlled and stable aircraft), and/or other movable support structures. FIG. 2B illustrates another example digital X-ray imaging system 250 having multiple frame sections 252, 254. For example, a first frame section 252 may hold the X-ray generator 204, the optical sensor(s) 236, and/or the thermal sensor(s) 238, and a second, separate frame section 254 may hold the X-ray detector 206. The frame sections 252, 254 can be separately maneuvered and positioned so that the X-ray radiation is directed from the X-ray generator 204 at the X-ray detector 206 at the time of operation. Additionally, the frame sections 252, 254 may include corresponding power sources (e.g., batteries 210a, 210b), separate computing devices 208a, 208b or other processing and/or communication circuitry, and/or separate operator input device(s) 214a, 214b.

Figure 3:
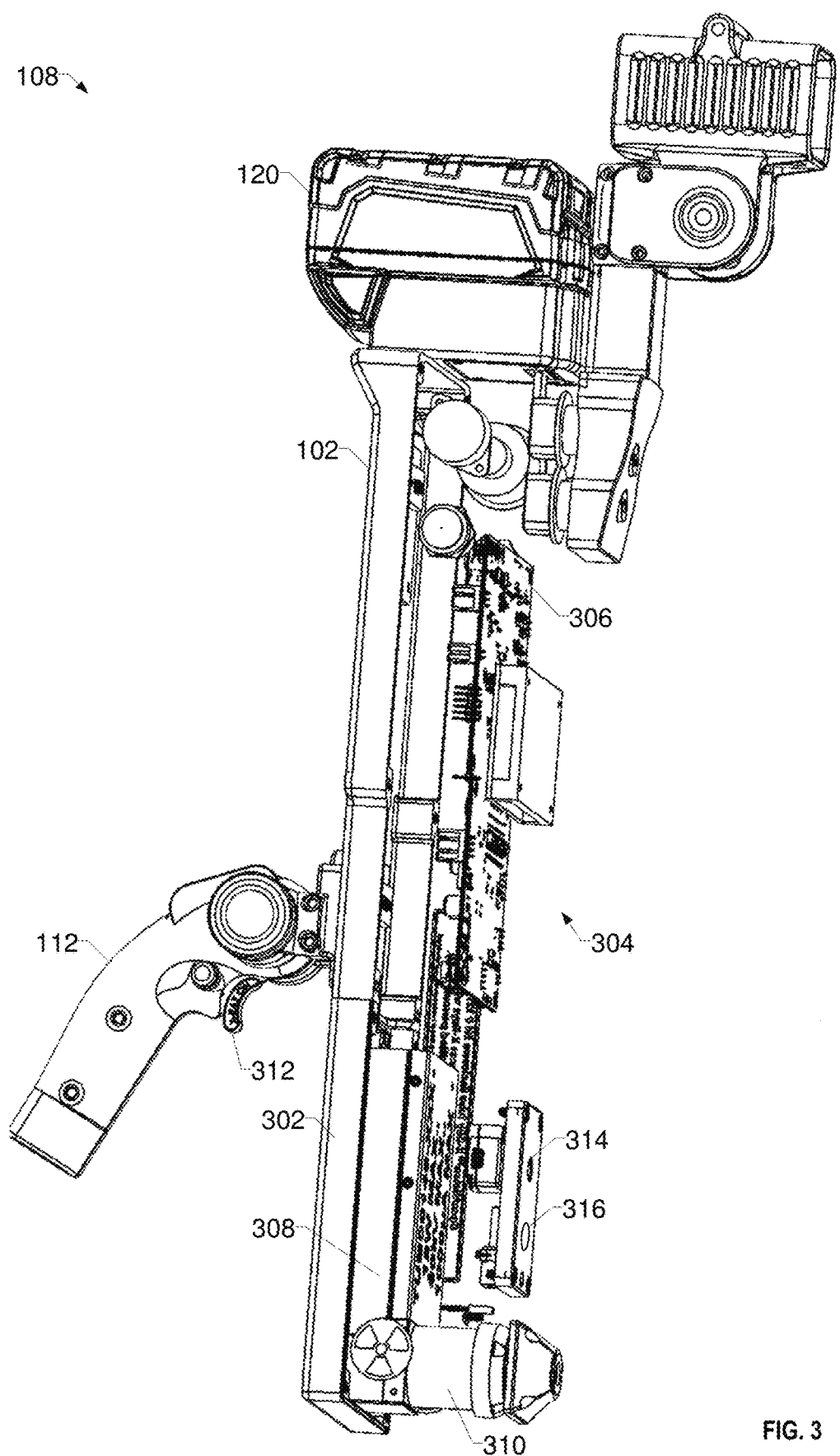
FIG. 3 is a perspective view of a first portion of the handheld X-ray imaging system of FIG. 1, including an X-ray generator, a power supply, an operator control handle.

FIG. 3 is a perspective view of the first portion 108 of the handheld X-ray imaging system 100 of FIG. 1, including the X-ray generator 104, the power supply 120, and the operator control handle 112. FIG. 3 is illustrated with a portion of a housing 302, while a second portion of the housing (shown in FIG. 1) is omitted for visibility of other components.

The example first portion 108 is further coupled to a computing device 304, such as the computing device 208 of FIG. 2A. The computing device 304 is attached to the frame 102 via a printed circuit board 306.

An X-ray tube 308 (e.g., the X-ray tube 218 of FIG. 2A) is coupled to a collimator 310 (e.g., the collimator 220 of FIG. 2A) and controlled by the computing device 304 and/or by an operator input device on the handle 112. As shown in FIG. 3, the handle 112 may include an X-ray trigger 312 (e.g., one of the operator input device(s) 214 of FIG. 2A). When actuated (e.g., by the operator of the handheld X-ray imaging system 100), the X-ray trigger 312 activates the X-ray tube 308 to generate X-ray radiation. The X-ray trigger 312 may activate the X-ray tube 308 directly and/or via the computing device 304.

The collimator 310 filters X-ray radiation generated by the X-ray tube 308 to reduce the X-ray radiation that is not directed at the X-ray detector 106 and/or to increase the proportion of X-ray radiation that is directed at the X-ray detector 106 (e.g., radiation that ends up being incident on a scintillator of the X-ray detector 106) relative to radiation not directed at the X-ray detector 106.

A targeting camera 314 (e.g., the optical sensor(s) 238 of FIG. 2A) is coupled to the computing device 304 to enable an operator of the handheld X-ray imaging system 100 to determine a target of generated X-rays. The example targeting camera 314 generates and outputs digital images (e.g., digital video, digital still images, etc.) to the computing device 304 for display to the operator via the display device 118. The digital images of the target (e.g., an exterior of the target) may be saved in association with the digital images of the X-ray scanning to provide contextual information about the location or object from which digital X-ray images are captured. Additionally or alternatively, a laser may be projected from the location of the targeting camera 314 toward the X-ray detector 106. The laser illuminates an approximate location on a workpiece that is being scanned by the digital X-ray imaging system 100 and/or output to the display device 118.

A thermal camera 316 (e.g., the thermal sensor(s) 236 of FIG. 2A) is also provided adjacent the targeting camera 314. The thermal camera 316 is coupled to the computing device 304 to provide thermal images having a field of view that at least partially overlaps the projection field of the X-ray tube 308.

Figure 4:
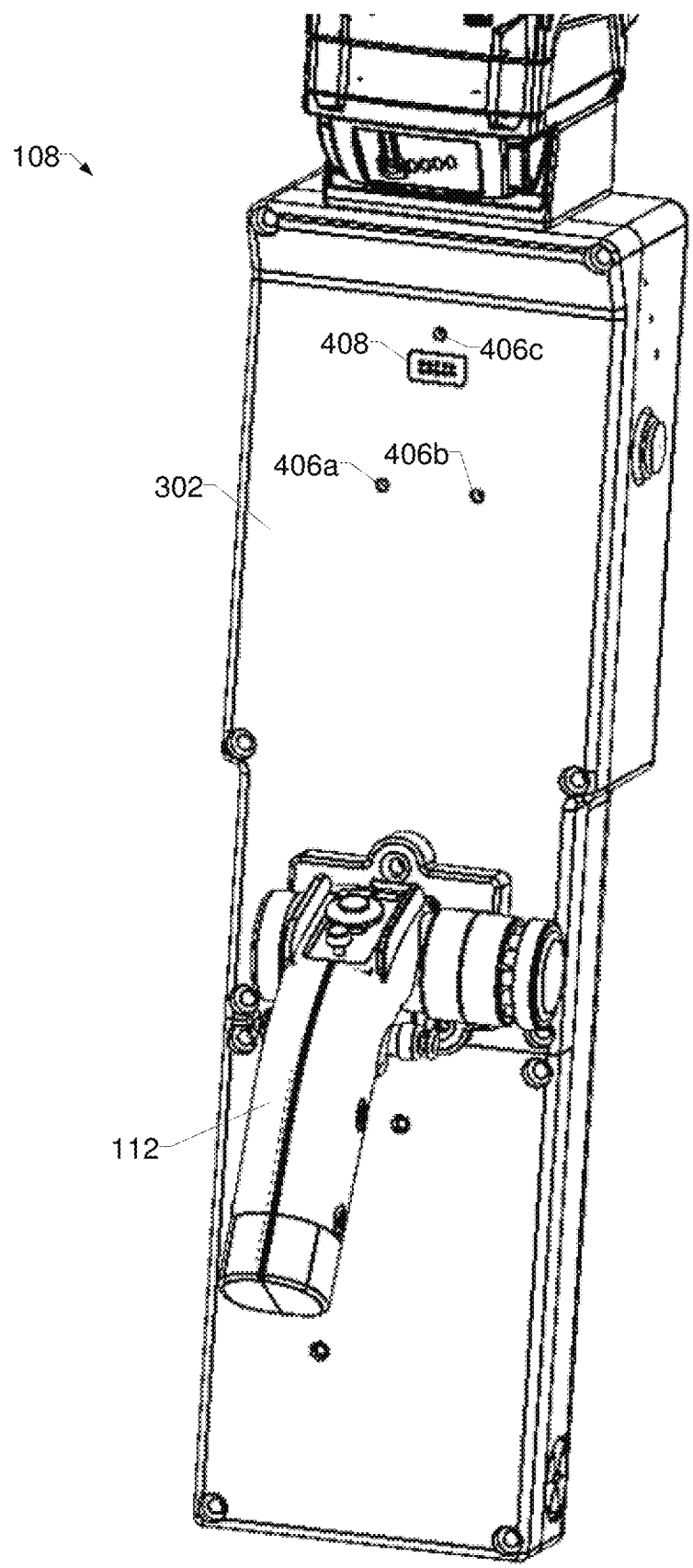
FIG. 4 is a more detailed view of the first portion of the handheld X-ray imaging system of FIG. 3 including the example handle.

FIG. 4 is a more detailed view of the first portion 108 of the handheld X-ray imaging system of FIG. 3 including the example handle 112. To improve the handling of the digital X-ray imaging system 100, the handle 112 is capable of attachment to multiple locations on the frame 102. The handle 112 is illustrated at a first location 402 on the frame 102 in FIG. 4. In the example of FIG. 4, the handle 112 is secured to the housing 302 via multiple screws.

The handle 112 may be detached from the first location 402 and attached at a second location 404. As illustrated in FIG. 4, the second location 404 on the housing 302 includes multiple screw nuts 406a-406c and a data connector 408, which match screw nuts and a data connector at the first location 402. The example handle 112 may be attached to the second location 404 by connecting a corresponding connector on the handle 112 to the data connector 408 and screwing the handle into the screw nuts 406a-406c.

Figure 5A:
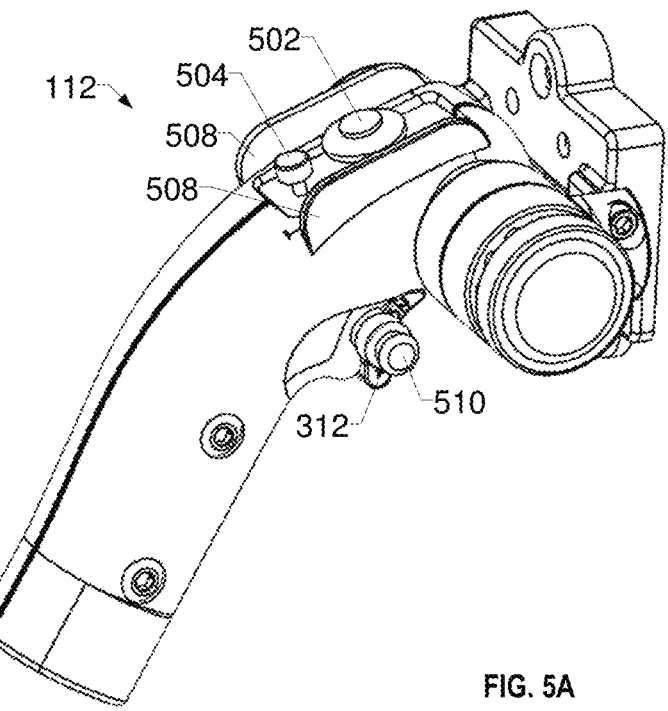
FIGS. 5A and 5B illustrate perspective views of the example handle of FIG. 3.
Figure 5B:
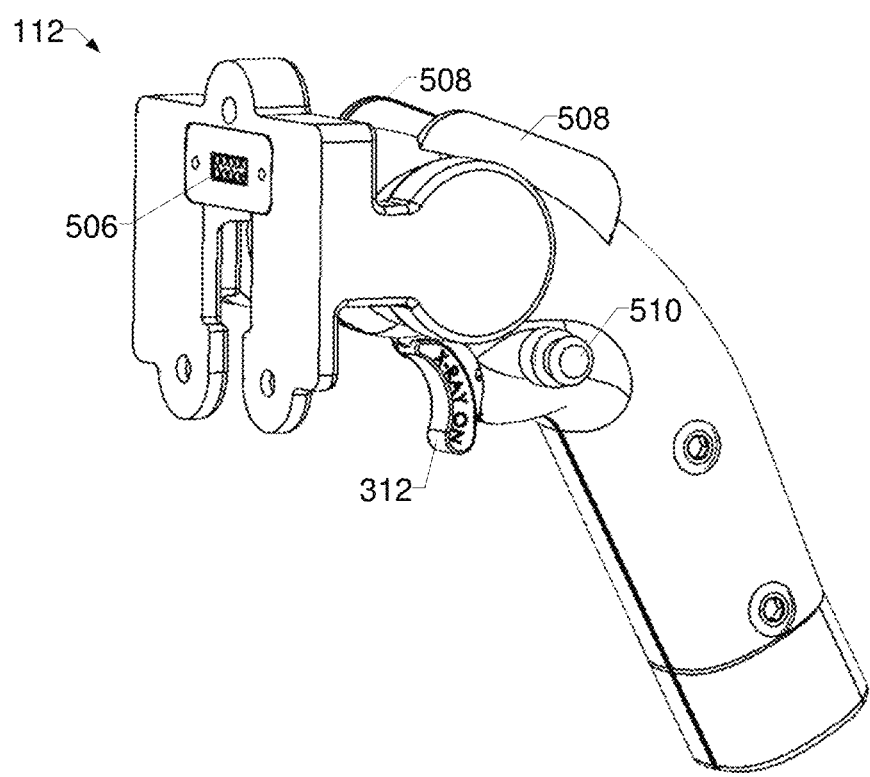

FIGS. 5A and 5B illustrate perspective views of the example handle 112 of FIGS. 1 and 3. As mentioned above, the handle 112 includes the trigger 312, which enables and/or activates the X-ray tube 308 to output the X-ray radiation. The handle 112 includes additional input devices 502, 504 (e.g., operator input devices 214 of FIG. 2A). The input device 502 is a thumbstick, which can be used to input commands to the computing device 304, such as navigating menus, confirming selections, configuring the X-ray tube 308 and/or the X-ray generator 106, changing views and/or any other type of operator input. The input device 504 is a push button that may be used by an operator to confirm and/or cancel a selection. The computing device 304 controls the X-ray tube 308, the X-ray detector 106 (e.g., the X-ray generator 204 and/or the digital imaging sensor 232 of FIG. 2A), the display device 118, and/or any other aspect of the digital X-ray imaging system 100 based on input from the trigger 312, the input devices 502, 504, and/or any other input devices.

The handle 112 includes a data connector 506, which mates to the data connector(s) 408 on the housing 302. The data connectors 408, 506 establish a hard-wired connection between the trigger 312 and/or the input devices 502, 504 and the computing device 304 and/or other circuitry.

The handle 112 includes input guards 508, which protect the input devices 502, 504 from accidental damage. The input guards 508 extend from the handle 112 adjacent the input devices 502, 504 and farther than the input devices 502, 504.

The example handle 112 further includes a trigger lock 510. The trigger lock 510 is a mechanical lock that, when activated, mechanically prevents activation of the trigger 312. The example trigger lock 510 is a push-button safety that locks the trigger 312 against depression by the operator.

Figure 6:
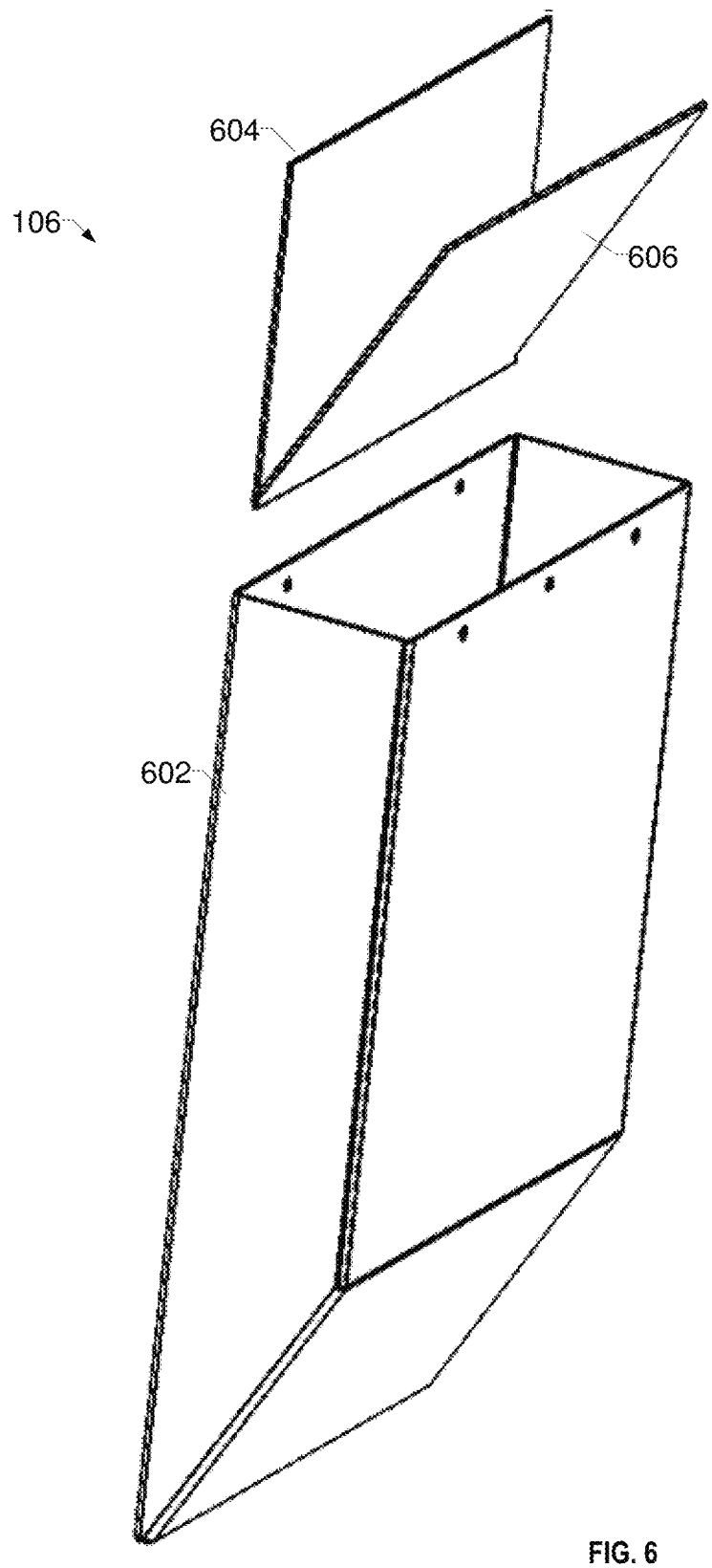
FIG. 6 is a partially exploded view of the example digital X-ray detector of FIG. 1.
Figure 7:
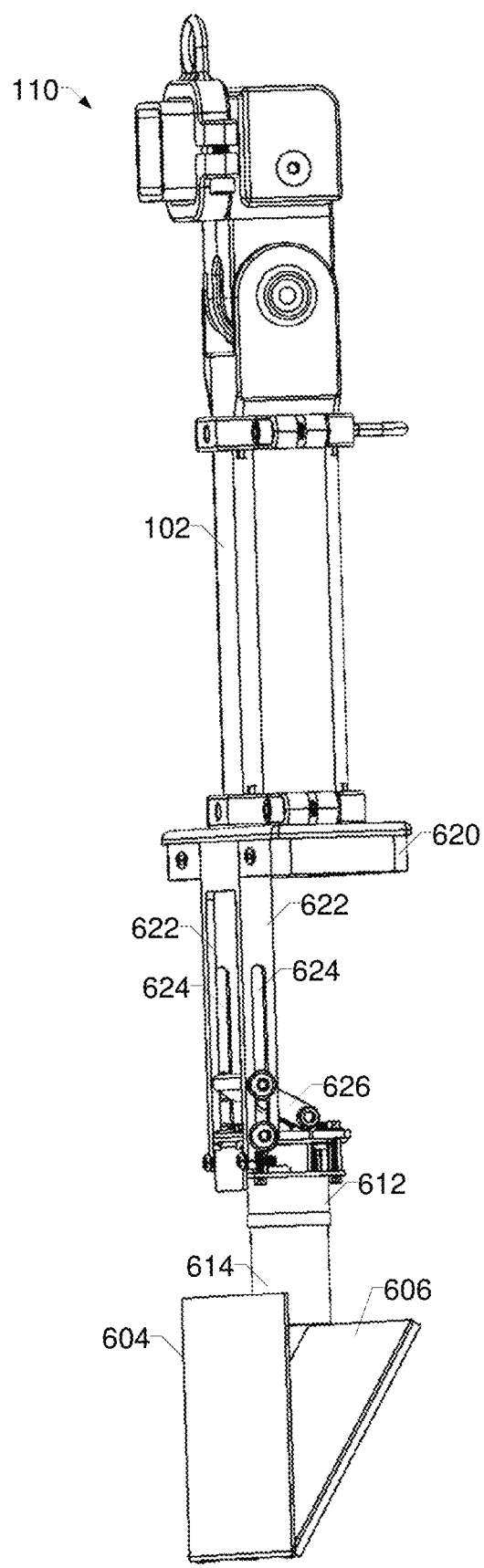
FIG. 7 is a perspective view of a first portion of the handheld X-ray imaging system of FIG. 1, including a digital X-ray detector assembly.

FIG. 6 is a partially exploded view of the example digital X-ray detector 106 of FIG. 1. FIG. 7 is a perspective view of the example digital X-ray detector 106 of FIG. 1. As illustrated in FIG. 6, the X-ray detector 106 includes a detector housing 602, a scintillation screen 604, and a reflector 606. The scintillation screen 604 and the reflector 606 are held within the housing 602 and are illustrated in FIG. 6 to show the relationship between the shape of the housing 602 and the geometries of the scintillation screen 604 and the reflector 606.

The detector housing 602 may be constructed using carbon fiber, aluminum, and/or any other material and/or combination of materials. The example detector housing 602 may function as a soft X-ray filter to reduce undesired X-ray radiation at the scintillation screen 604, thereby reducing noise in the resulting digital image. The scintillation screen 604 and/or the reflector 606 may be attached to the detector housing 602 using adhesive (e.g., epoxy, glue, etc.) and/or any other attachment technique. In some examples, the detector housing 602 is lined with a layer of lead or another backscatter shielding material to lower the dose to the operator in a handheld system.

Figure 8:
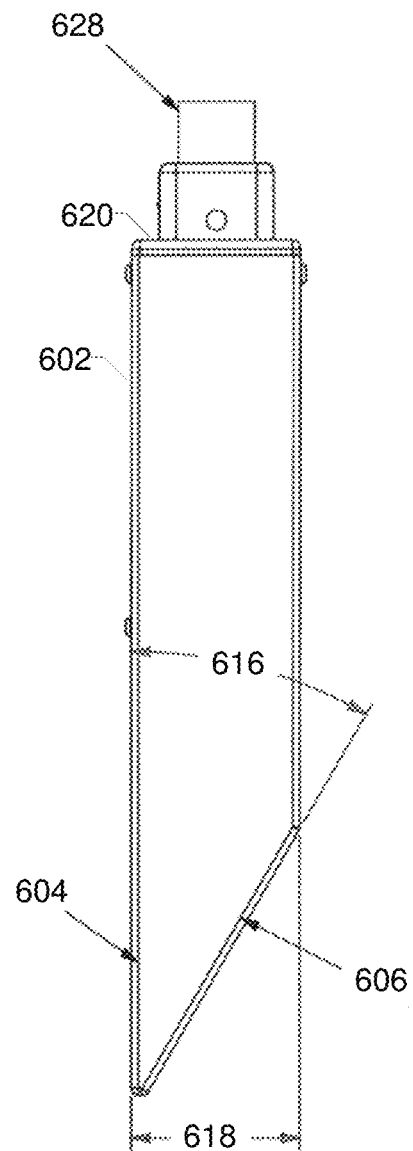
FIG. 8 is a side view of the example digital detector housing, the scintillator, and the reflector.
Figure 9:
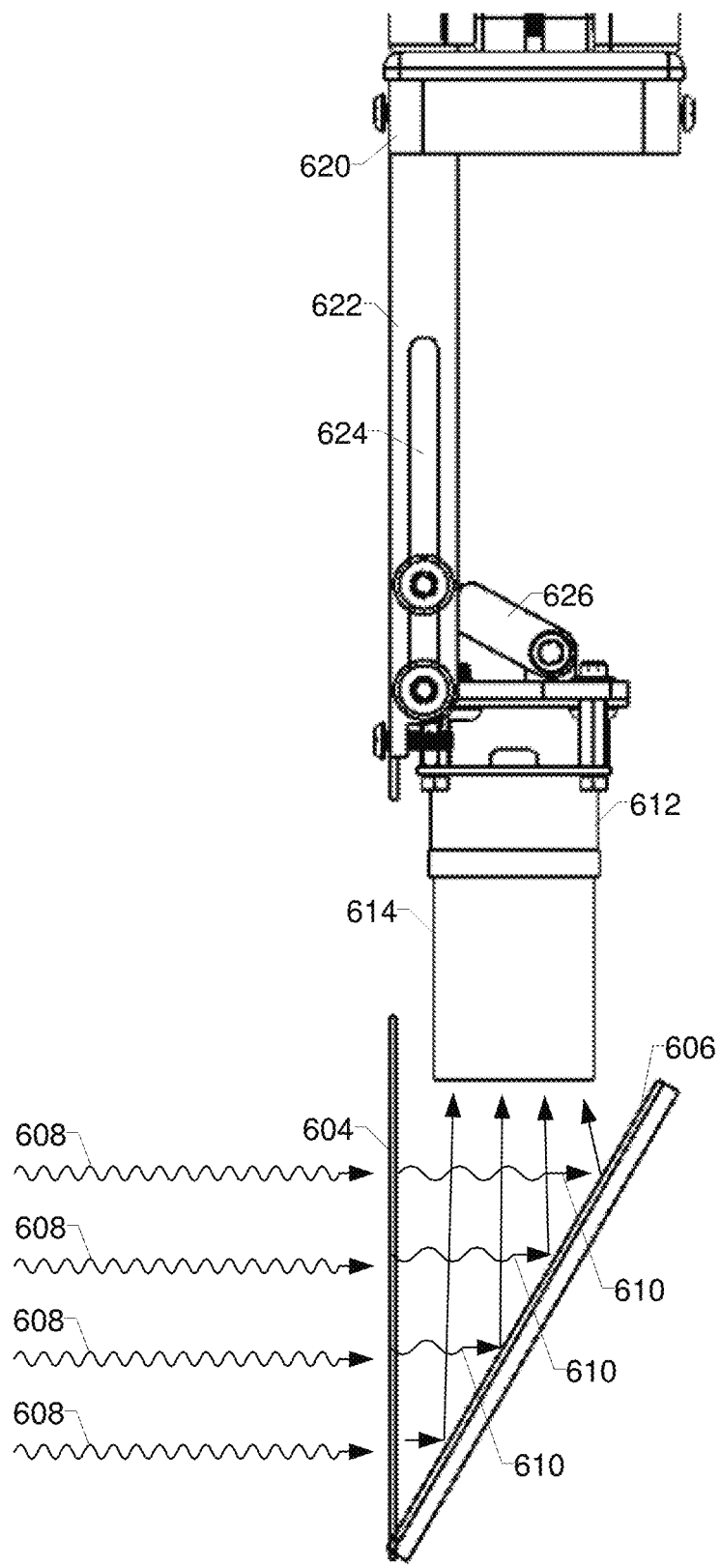
FIG. 9 is a side view of the example digital X-ray detector of FIG. 1, illustrating imaging of incident X-rays by the digital X-ray detector.

FIG. 8 is a side view of the example digital detector housing, the scintillator, and the reflector. FIG. 9 is a side view of the example digital X-ray detector 106 of FIG. 1, illustrating imaging of incident X-rays by the digital X-ray detector. As illustrated in FIG. 9, a digital imaging sensor 612 is oriented to capture light generated by the scintillation screen 604 in response to incident X-ray radiation.

The scintillation screen 604 converts incident X-rays 608 to visible light 610. An example scintillation screen 604 that may be used in a handheld X-ray scanner has a surface area of 4 inches by 6 inches. The size and material of the scintillation screen 604 at least partially determines the size, brightness, and/or resolution of the resulting digital images. The example scintillation screen is Gadox (Gadolinium oxysulphide) doped with Terbium, which emits a peak visible light at a wavelength of substantially 560 nm.

The example reflector 606 is a mirror that reflects visible light generated by the scintillation screen 604 to the digital imaging sensor 612 (e.g., via a lens 614). The example reflector 606 has the same surface area (e.g., 4 inches by 6 inches) as the scintillation screen 604, and is oriented at an angle 616 to direct the visible light 610 to the digital imaging sensor 612 and/or the lens 614. An example angle 616 is 30 degrees, which enables a 4 inch by 6 inch scintillation screen and a 4 inch by 6 inch reflector 606 to fit within a housing having a thickness 618 of less than 2.5 inches. In other examples, the angle 616 is an angle less than 45 degrees. Other sizes and/or geometries may be used for the scintillation screen 604 and/or the reflector 606. Additionally or alternatively, the digital X-ray detector 106 may include optics such as prisms to direct the visible light 610 to the digital imaging sensor 612.

The example digital imaging sensor 612 is a solid state sensor such as a CMOS camera. In the illustrated example using the scintillation screen 604 and the reflector 606, and a 6 mm lens 614, the digital imaging sensor 612 has a field of view of 143 degrees to capture light from substantially the entirety of the reflector 606.

The digital imaging sensor 612 is coupled to an imager bracket 620 via a mounting brackets 622. The detector housing 602 is also coupled to the imager bracket 620. The imager bracket 620 couples both the detector housing 602 and the digital imaging sensor 612 to the frame 102 of the handheld X-ray imaging system 100.

The mounting brackets 622 includes slots 624 to which an imaging bracket 626 is adjustably coupled. The digital imaging sensor 612 is attached to the imaging bracket 626 (e.g., via a printed circuit board). The imaging bracket 626 may be adjusted and secured along the length of the slots 624 to adjust an angle of the digital imaging sensor 612 relative to the reflector 606. The field of view of the digital imaging sensor 612 is oriented substantially perpendicularly to the scintillation screen 604, within the angular limits permitted using the slots 624 and the imaging bracket 626.

The example imager bracket 620 may include a data connector 628 (FIG. 8) to enable sufficient data throughput from the digital imaging sensor 612 to a computing device or other image display and/or image storage devices. An example data connector 628 may be a USB 3.0 connector to connect a USB 3.0 bus between the digital imaging sensor 612 and the receiving device. The USB 3.0 bus provides sufficient bandwidth between the digital imaging sensor 612 and the receiving device for high-definition video or better resolution.

While an example implementation of the X-ray detector 106 is described above, other example implementations of the X-ray detector 106 include using a solid state image sensor, such as a CMOS panel or a CCD panel, coupled directly to a scintillator. The CMOS panel produces digital images based on visible light generated by the scintillator, and outputs the digital images to the computing device 304.

Figure 10:
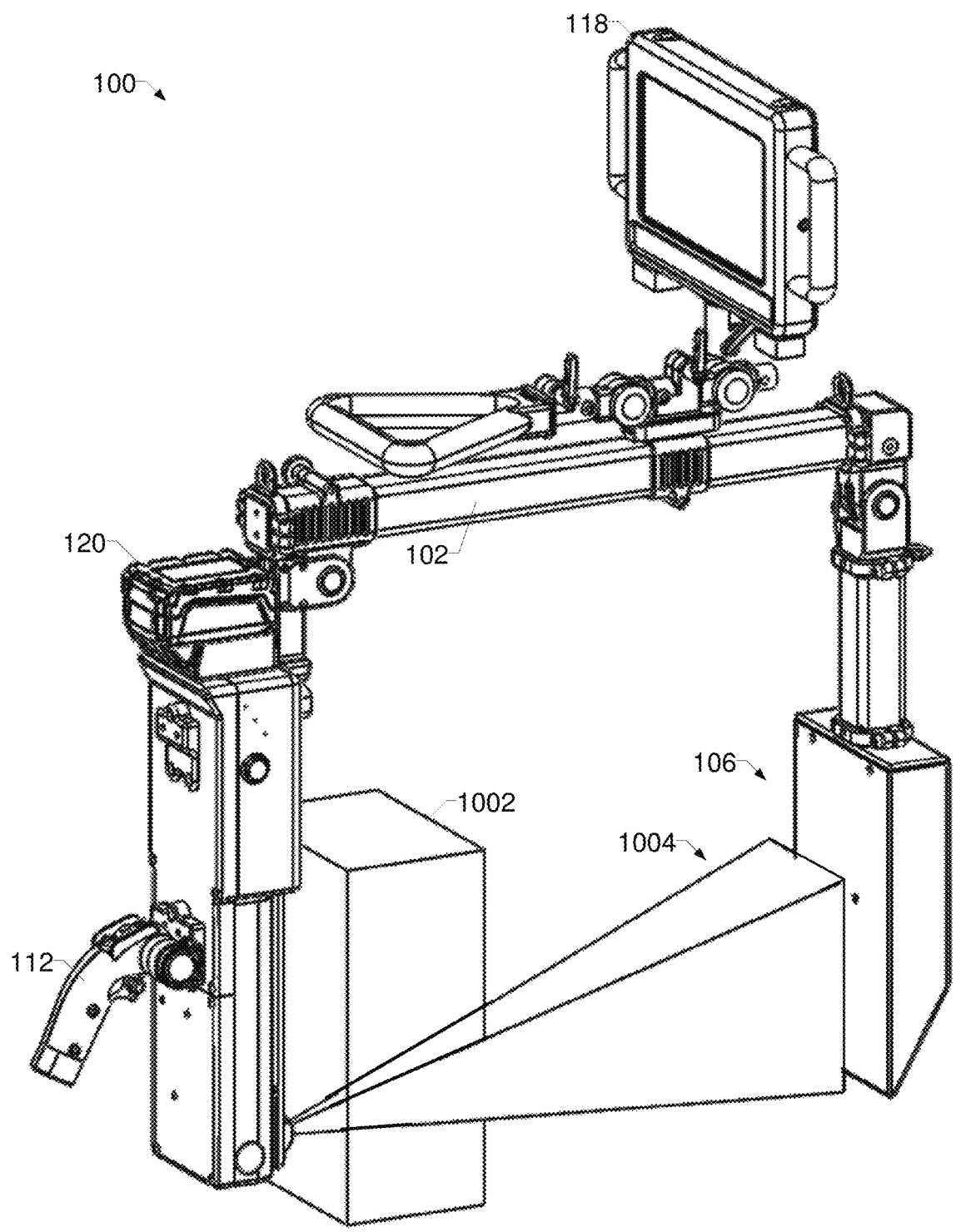
FIG. 10 is a side view of the handheld X-ray imaging system of FIG. 1, illustrating scanning of an object under test by directing X-rays from the X-ray tube to the X-ray detector.

FIG. 10 is a side view of the handheld X-ray imaging system of FIG. 1, illustrating scanning of an object 1002 under test by directing X-rays 1004 from the X-ray tube 308 to the X-ray detector 106. As mentioned above, the collimator 310 reduces X-ray radiation that is not directed at the X-ray detector 106, so the concentration of the X-ray radiation 1004 that is not scattered by the object 1002 is incident on the X-ray detector 106.

Figure 11A:
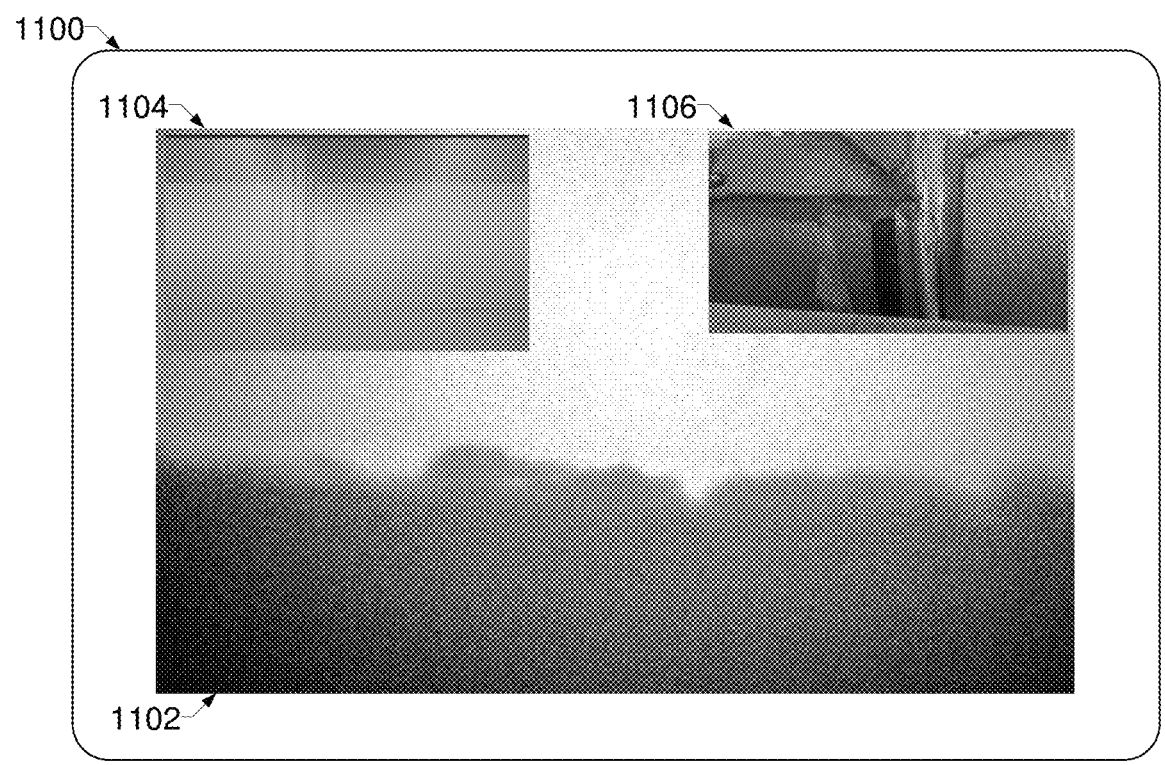
FIGS. 11A and 11B illustrate an example display device configured to simultaneously display thermal and/or optical image(s) in combination with digital X-ray images using primary images with secondary and/or tertiary images.

FIG. 11A illustrates an example display device 1100 that may be used to implement the display device(s) 212 of FIG. 2A, configured to simultaneously display thermal and/or optical image(s) in combination with digital X-ray images. The example display device 1100 may be a display screen, a touchscreen, or any other type of display device coupled with an input. In the example of FIG. 11A, the display device 1100 receives X-ray images 1102 (e.g., generated by the X-ray detector 206), thermal image(s) 1104 (e.g., generated by the thermal sensor(s) 238), and optical image(s) 1106 (e.g., generated by the optical sensor(s) 236).

As illustrated in FIG. 11A, the display device 1100 displays the X-ray images 1102 as the primary, largest images to enable the operator to see the features of the X-ray images 1102 most clearly. Conversely, the display device 1100 displays the thermal images 1104 and the optical images 1106 as secondary images, which are smaller than the primary image.

Figure 11B:
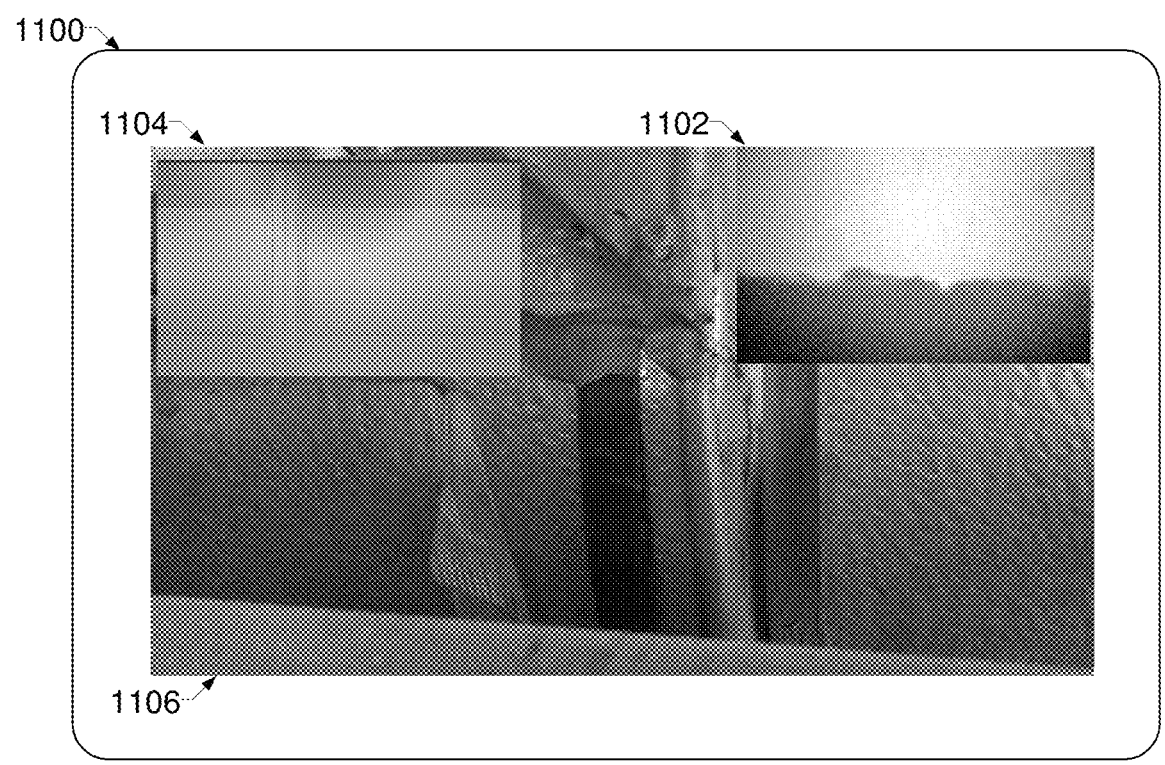

Using an input device, an operator may select the optical images 1106 to cause the display device 1100 to output the optical images 1106 as the primary, large images and output the X-ray images 1102 as the secondary, smaller images, as illustrated in FIG. 11B.

The operator may also be permitted to resize any of the primary images or the secondary images, to rearrange the location(s) of the secondary images, to change the display from larger and smaller images to side-by-side or top-bottom arrangements, and/or otherwise modify the display of the X-ray images 1102, the thermal images 1104, and/or the optical images 1106.

Figure 11C:
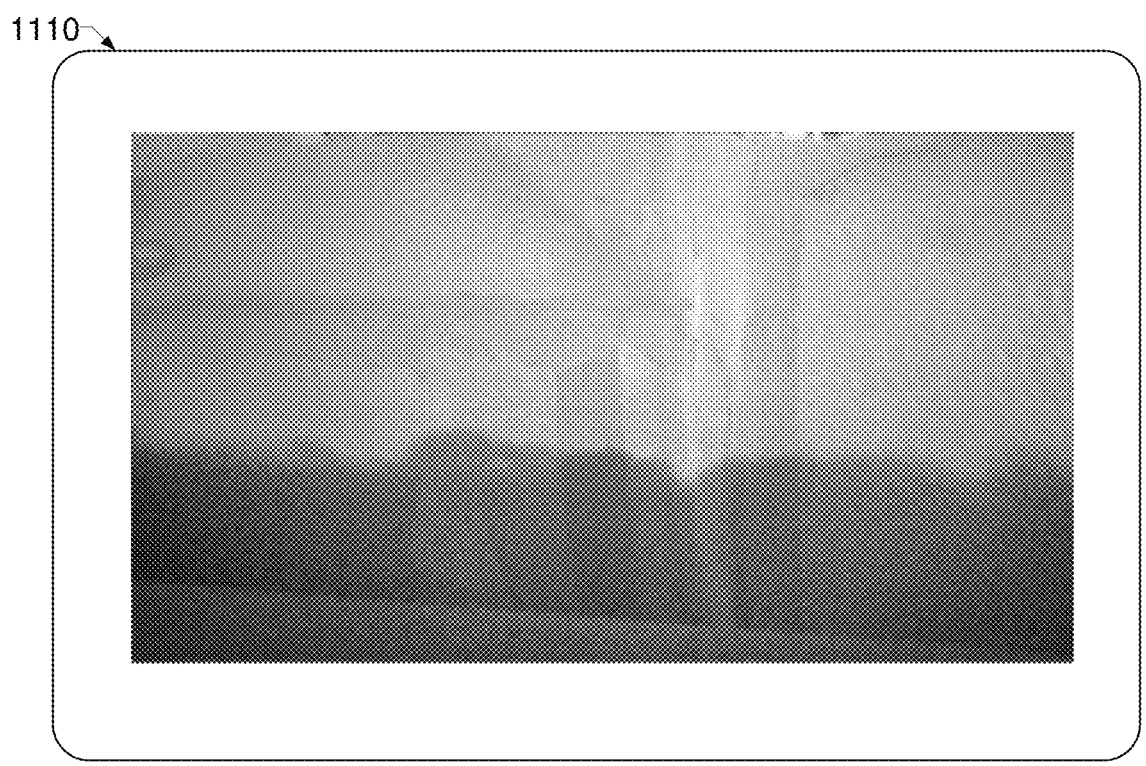
FIG. 11C illustrates another example display device configured to simultaneously display thermal and/or optical in combination with digital X-ray images by controlling opacity of one or more sets of images.

FIG. 11C illustrates another example display device 1110 configured to simultaneously display thermal images and/or optical images in combination with digital X-ray images by controlling opacity of one or more sets of images. In the example of FIG. 11C, the display device 1110 has the X-ray images captured with the X-ray detector 206 overlaid with the optical images captured with the optical sensor(s) 236. By controlling (e.g., reducing) the opacity of one or both of the images, the images may be overlaid on the display device 1110 to simultaneously show the observable features of each of the images. In some examples, the images may be offset in one or two dimensions to physically align the images, based on differences or offsets in the fields of view.

In some examples, the computing device 208 calculates and overlays a nominal image of the object over the primary image (e.g., the X-ray image 1102 in FIG. 11A). For example, the computing device 208 may identify a prior scan or other representation of the object as a "digital twin" of the object for visual comparison in real-time by the operator during the scanning operation. The computing device 208 may use positioning data (e.g., accelerometer and/or gyroscope data related to orientation of the scanning system 200, a GPS signal from a GPS sensor, image comparisons, and/or any other positioning information or technique) to calculate an overlay location of the digital twin on the display device 1100 to align with the X-ray image 1102.

Figure 12:
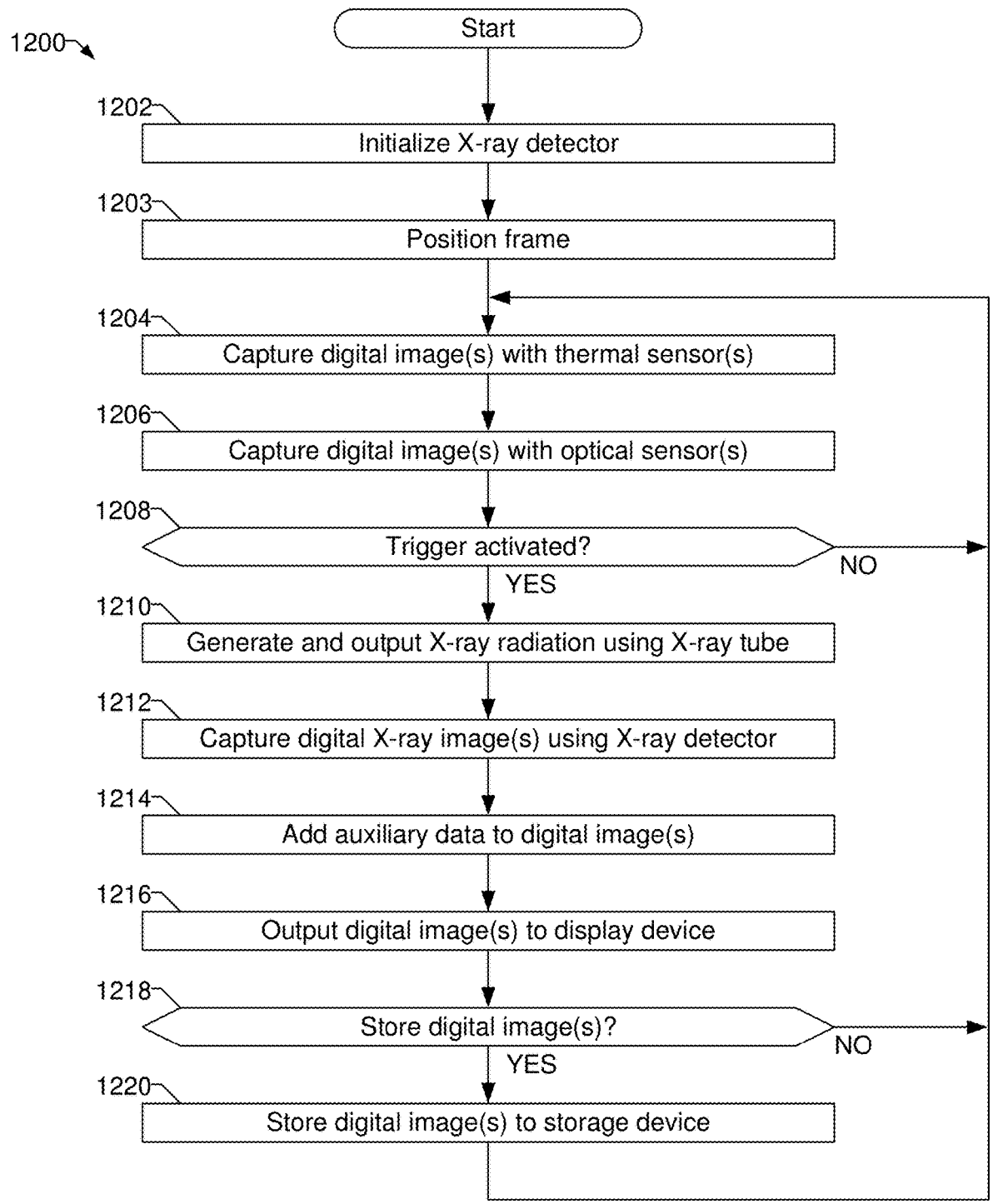
FIG. 12 is a flowchart representative of example machine readable instructions which may be executed by the example computing device of FIG. 2A or 2B to perform digital X-ray imaging in combination with thermal and/or optical imaging.

FIG. 12 is a flowchart representative of example machine readable instructions 1200 which may be executed by the example computing device 208 of FIG. 2A to perform digital X-ray imaging. The example machine readable instructions 1200 of FIG. 12 are described below with reference to the digital X-ray imaging system 200 of FIG. 2A, but may be performed by the digital X-ray imaging system 100 of FIG. 1.

At block 1202, the example computing device 208 initializes the X-ray detector 206. For example, the computing device 208 may verify that the X-ray detector 206 is in communication with the computing device 208 and/or is configured to capture digital images of X-ray radiation. At block 1203, an operator of the digital X-ray imaging system 200 may position the frame 202 adjacent on object under test, such that the object under test is located between the X-ray detector 206 and the X-ray tube 218.

At block 1204, the computing device 208 captures digital thermal image(s) with the thermal sensor(s) 238. At block 1206, the computing device 208 captures digital optical image(s) with the optical sensor(s) 236. The digital thermal image(s) and/or the digital optical image(s) may include continuous live streams of image frames, periodic images, and/or any other image frequency.

At block 1208, the computing device 208 determines whether a trigger is activated. For example, the computing device 208 may activate the X-ray tube 218 in response to activation of a trigger (e.g., a physical trigger, a button, a switch, etc.) by an operator. If the trigger has not been activated (block 1208), control returns to block 1204 to continue capturing thermal and/or optical images.

When the trigger is activated (block 1208), at block 1210 the X-ray tube 218 generates and outputs X-ray radiation. At block 1212, the X-ray detector 106 (e.g., via the scintillation screen 228, the reflector 230, and the digital imaging sensor 232, and/or via a solid state panel coupled to a scintillator) captures digital image(s) (e.g., digital still images and/or digital video). The X-ray detector 106 provides the captured digital image(s) to the computing device 208. At block 1214, the computing device 208 adds the auxiliary data to the digital X-ray, thermal, and/or optical image(s). Example auxiliary data includes a timestamp, a date stamp, geographic data, and/or an inclination of the frame 202, the X-ray detector 206, the X-ray tube 218, and/or any other component of the digital X-ray imaging system 200. At block 1216, the computing device 208 outputs the digital image(s) to the display device(s) 218 (e.g., via a wired and/or wireless connection). In some examples, the computing device 208 outputs the digital image(s) to an external computing device such as a laptop, a smartphone, a server, a tablet computer, a personal computer, and/or any other type of external computing device.

At block 1218, the computing device 208 determines whether the digital image(s) are to be stored (e.g., in a storage device). If the digital image(s) are to be stored (block 1218), at block 1220 the example computing device 208 stores the image(s). In some examples, the computing device 208 stores the digital X-ray images with the thermal image(s) and/or optical image(s) such that the image(s) are synchronized for subsequent playback. The example computing device 208 may be configured to store the digital image(s) in one or more available storage devices, such as a removable storage device.

After storing the image(s) (block 1220), or if the digital image(s) are not to be stored (block 1218), control returns to block 1204. In some examples, blocks 1210-1120 may be iterated substantially continuously until the trigger is deactivated.

Figure 13:
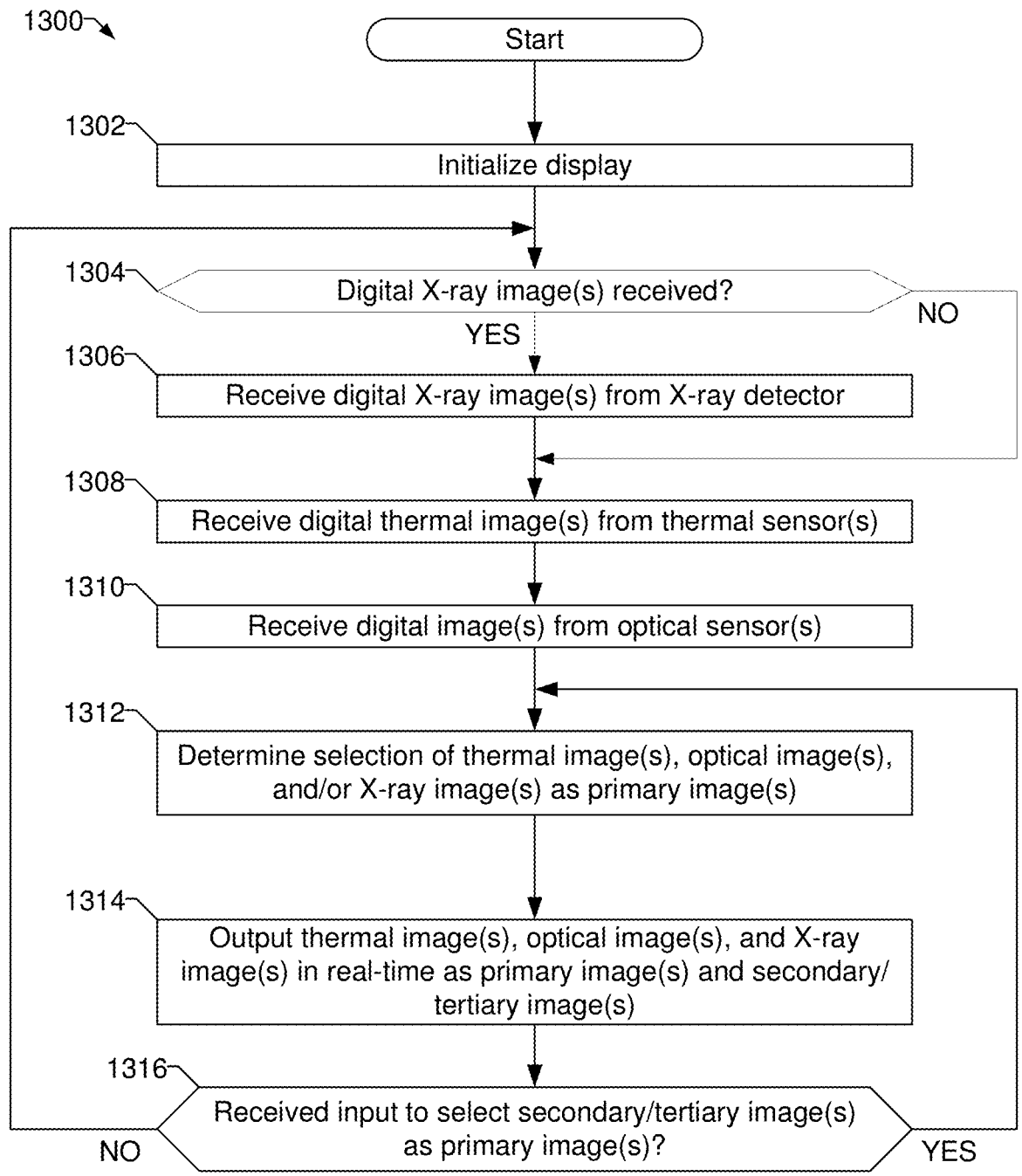
FIG. 13 is a flowchart representative of example machine readable instructions which may be executed by the example display device(s) of FIG. 2A or 2B to display digital X-ray images in combination with thermal and/or optical images.

FIG. 13 is a flowchart representative of example machine readable instructions 1300 which may be executed by the example display device(s) 212 of FIG. 2A to display digital X-ray images in combination with thermal and/or optical images. The instructions 1300 may be performed by an included or separate display device 212, which may be implemented using the example computing system disclosed below with reference to FIG. 14.

At block 1302, the display device 212 initializes a display. The display may be, for example, an LCD screen, a touchscreen, an OLED screen, or any other display type. At block 1304, the display device 212 determines whether digital X-ray image(s) have been received. For example, the display device 212 may communicate with the computing device 208 of the digital X-ray imaging system 200 via wired or wireless communications. If digital X-ray image(s) have been received (block 1304), at block 1306 the display device 212 receives the digital X-ray images from the X-ray detector 206.

After receiving the digital X-ray image(s) (block 1306), or if the digital X-ray image(s) are not received (block 1304), at block 1308 the display device 212 receives digital thermal image(s) from the thermal sensor(s) 238. At block 1310 the display device 212 receives digital optical image(s) from the optical sensor(s) 236. In some examples, digital X-ray image(s) are provided while the X-ray output is active and the X-ray detector 206 is receiving the X-ray radiation for generation of images. In some examples, block 1308 or 1310 may be omitted or skipped if the applicable sensor type is not present or not generating output images.

At block 1312, the display device 212 determines a selection of the thermal image(s), the optical image(s), and/or the X-ray image(s) as primary image(s). For example, the selection may be a default, may be automatic based on one or more variables (e.g., automatically selecting the X-rays as primary images when the X-ray image(s) are being received), and/or based on an operator selection. At block 1314, the display device 212 outputs the thermal image(s), the optical image(s), and/or the X-ray image(s) in real-time as primary image(s) and secondary/tertiary image(s).

At block 1316, the display device 212 determines whether an input has been received to select the secondary or tertiary feed of image(s) as the primary image(s). For example, the operator may touch or click on the secondary optical image(s) of FIG. 11A to make the optical image(s) the primary image(s) and change the X-ray image(s) to the secondary images as shown in FIG. 11B.

If an input has not been received to select the secondary or tertiary feed (block 1316), control returns to block 1304 to continue receiving images. If an input to select the secondary or tertiary feed has been received (block 1316), control returns to block 1312 to update the selection of the primary image(s) based on the input.

Figure 14:
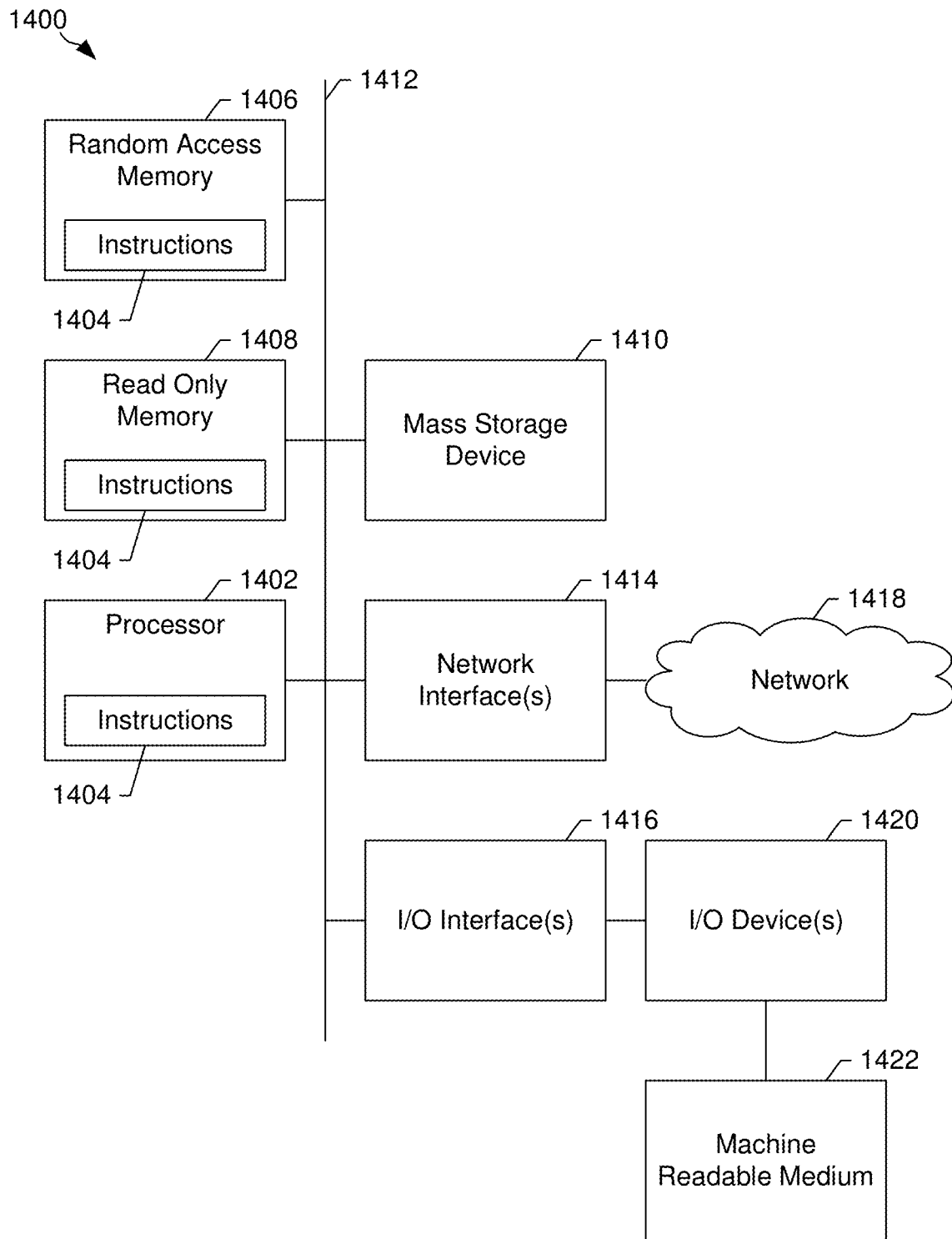
FIG. 14 is a block diagram of an example computing system that may be used to implement the computing device and/or the display devices of FIG. 2A or 2B.

FIG. 14 is a block diagram of an example computing system 1400 that may be used to implement either or both of the computing devices 208, 208*a*, 208*b* and/or the display device(s) 212 of FIGS. 2A and/or 2B. The example computing system 1400 may be implemented using a personal computer, a server, a smartphone, a laptop computer, a workstation, a tablet computer, and/or any other type of computing device.

The example computing system 1400 of FIG. 14 includes a processor 1402. The example processor 1402 may be any general purpose central processing unit (CPU) from any manufacturer. In some other examples, the processor 1402 may include one or more specialized processing units, such as RISC processors with an ARM core, graphic processing units, digital signal processors, and/or system-on-chips (SoC). The processor 1402 executes machine readable instructions 1404 that may be stored locally at the processor (e.g., in an included cache or SoC), in a random access memory 1406 (or other volatile memory), in a read only memory 1408 (or other non-volatile memory such as FLASH memory), and/or in a mass storage device 1410. The example mass storage device 1410 may be a hard drive, a solid state storage drive, a hybrid drive, a RAID array, and/or any other mass data storage device.

A bus 1412 enables communications between the processor 1402, the RAM 1406, the ROM 1408, the mass storage device 1410, a network interface 1414, and/or an input/output interface 1416.

The example network interface 1414 includes hardware, firmware, and/or software to connect the computing system 1400 to a communications network 1418 such as the Internet. For example, the network interface 1414 may include IEEE 802.X-compliant wireless and/or wired communications hardware for transmitting and/or receiving communications.

The example I/O interface 1416 of FIG. 14 includes hardware, firmware, and/or software to connect one or more input/output devices 1420 to the processor 1402 for providing input to the processor 1402 and/or providing output from the processor 1402. For example, the I/O interface 1416 may include a graphics processing unit for interfacing with a display device, a universal serial bus port for interfacing with one or more USB-compliant devices, a FireWire, a field bus, and/or any other type of interface. Example I/O device(s) 1420 may include a keyboard, a keypad, a mouse, a trackball, a pointing device, a microphone, an audio speaker, an optical media drive, a multi-touch touch screen, a gesture recognition interface, a display device (e.g., the display device(s) 118, 212) a magnetic media drive, and/or any other type of input and/or output device.

The example computing system 1400 may access a non-transitory machine readable medium 1422 via the I/O interface 1416 and/or the I/O device(s) 1420. Examples of the machine readable medium 1422 of FIG. 14 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Example wireless interfaces, protocols, and/or standards that may be supported and/or used by the network interface(s) 1414 and/or the I/O interface(s) 1416, such as to communicate with the display device(s) 212, include wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+ (e.g., GSM/GPRS/EDGE, and IS-95 or cdmaOne) and/or 2G/2G+ (e.g., CDMA2000, UMTS, and HSPA); 4G standards, such as WiMAX (IEEE 802.16) and LTE; Ultra-Wideband (UWB); etc. Example wired interfaces, protocols, and/or standards that may be supported and/or used by the network interface(s) 1414 and/or the I/O interface(s) 1416, such as to communicate with the display device(s) 212, include comprise Ethernet (IEEE 802.3), Fiber Distributed Data Interface (FDDI), Integrated Services Digital Network (ISDN), cable television and/or internet (ATSC, DVB-C, DOCSIS), Universal Serial Bus (USB) based interfaces, etc.

The processor 1402, the network interface(s) 1414, and/or the I/O interface(s) 1416, and/or the display device 212, may perform signal processing operations such as, for example, filtering, amplification, analog-to-digital conversion and/or digital-to-analog conversion, up-conversion/down-conversion of baseband signals, encoding/decoding, encryption/decryption, modulation/demodulation, and/or any other appropriate signal processing.

The computing device 208 and/or the display device 212 may use one or more antennas for wireless communications and/or one or more wired port(s) for wired communications. The antenna(s) may be any type of antenna (e.g., directional antennas, omnidirectional antennas, multi-input multi-output (MIMO) antennas, etc.) suited for the frequencies, power levels, diversity, and/or other parameters required for the wireless interfaces and/or protocols used to communicate. The port(s) may include any type of connectors suited for the communications over wired interfaces/protocols supported by the computing device 208 and/or the display device 212. For example, the port(s) may include an Ethernet over twisted pair port, a USB port, an HDMI port, a passive optical network (PON) port, and/or any other suitable port for interfacing with a wired or optical cable.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A portable radiography scanning system, comprising:
    a radiation detector configured to generate digital images based on incident radiation;
    a radiation source configured to output the radiation toward the radiation detector;
    a thermal sensor configured to capture thermal images and having a field of view that at least partially overlaps a projection field of the radiation;
    an optical sensor configured to capture optical images and having a field of view that at least partially overlaps a projection field of the radiation and at least partially overlaps the field of view of the thermal sensor; and
    a computing device configured to:
        control the radiation source;
        receive the digital images from the radiation detector;
        receive the thermal images from the thermal sensor; and
        output the digital images and the thermal images, in real-time, to a display device.

2. The portable radiography scanning system as defined in claim 1, further comprising a display device configured to display the digital images, the thermal images, and the optical images in real-time.

3. The portable radiography scanning system as defined in claim 1, wherein the computing device is configured to store the digital images, the thermal images, and the optical images on a storage device such that the digital images, the thermal images, and the optical images are synchronized.

4. The portable radiography scanning system as defined in claim 1, wherein the computing device is configured to store the digital images and the thermal images on a storage device.

5. The portable radiography scanning system as defined in claim 1, further comprising a frame configured to:
hold the radiation detector and the computing device;
hold the radiation source such that the radiation source directs the radiation to the radiation detector; and
hold the thermal sensor such that the field of view of the thermal sensor at least partially overlaps the projection field of the radiation.

6. The portable radiography scanning system as defined in claim 2, wherein the display device is configured to display a first one of a radiography feed of the digital images, a thermal feed of the thermal images, or an optical feed of the optical images as primary images on the display device, and display a second one of the radiography feed, the thermal feed, or the optical feed as secondary images on the display device.

7. The portable radiography scanning system as defined in claim 2, wherein the display device is communicatively coupled to the computing device via wireless communications.

8. The portable radiography scanning system as defined in claim 2, wherein the display device is communicatively coupled to the computing device via a wired connection.

9. The portable radiography scanning system as defined in claim 6, wherein the display device is configured to display a third one of the radiography feed, the thermal feed, or the optical feed as secondary images or tertiary images on the display device.

10. The portable radiography scanning system as defined in claim 6, wherein the display device is configured to, in response to a selection of the secondary images, switch the display of the selected secondary images to be displayed as primary images and switch display of the primary images to be displayed as secondary images.

11. The portable radiography scanning system as defined in claim 6, wherein the display device is configured to display the primary images at a first size and display the secondary images at a second size, the second size being smaller than the first size.

12. The portable radiography scanning system as defined in claim 5, wherein the display device comprises at least one of a desktop computer, a laptop computer, a smartphone, a tablet computer, a head worn display, or a display screen attached to the frame.

13. The portable radiography scanning system as defined in claim 5, wherein the frame comprises at least one of a robotic device, a drone aircraft, or a movable support structure.

14. A portable radiography scanning system, comprising:
a radiation detector configured to generate digital images based on incident radiation;
a radiation source configured to output the radiation toward the radiation detector;
a thermal sensor configured to capture thermal images and having a field of view that at least partially overlaps a projection field of the radiation;
a display device configured to display the digital images and the thermal images in real-time, wherein the display device is configured to display a first one of a radiography feed of the digital images or a thermal feed of the thermal images as primary images on the display device, and display a second one of the radiography feed or the thermal feed as secondary images on the display device; and
a computing device configured to:
control the radiation source;
receive the digital images from the radiation detector;
receive the thermal images from the thermal sensor; and
output the digital images and the thermal images, in real-time, to a display device.

15. The portable radiography scanning system as defined in claim 14, wherein the display device is configured to, in response to a selection of the secondary images, switch the display of the selected secondary images to be displayed as primary images and switch display of the primary images to be displayed as secondary images.

16. The portable radiography scanning system as defined in claim 14, wherein the display device is configured to display the primary images at a first size and display the secondary images at a second size, the second size being smaller than the first size.

17. A portable radiography scanning system, comprising:
a radiation detector configured to generate digital images based on incident radiation;
a radiation source configured to output the radiation toward the radiation detector;
a thermal sensor configured to capture thermal images and having a field of view that at least partially overlaps a projection field of the radiation;
a frame configured to:
hold the radiation detector and the computing device;
hold the radiation source such that the radiation source directs the radiation to the radiation detector; and
hold the thermal sensor such that the field of view of the thermal sensor at least partially overlaps the projection field of the radiation;
an optical sensor configured to capture optical images, wherein the frame is configured to hold the optical sensor such that a field of view of the optical camera at least partially overlaps a projection field of the radiation and at least partially overlaps the field of view of the thermal sensor; and
a computing device configured to:
control the radiation source;
receive the digital images from the radiation detector;
receive the thermal images from the thermal sensor; and
output the digital images and the thermal images, in real-time, to a display device.

18. A portable radiography scanning system, comprising:
a radiation detector configured to generate digital images based on incident radiation;
a radiation source configured to output the radiation toward the radiation detector;
a thermal sensor configured to capture thermal images and having a field of view that at least partially overlaps a projection field of the radiation;
a frame configured to:
hold the radiation detector and the computing device;
hold the radiation source such that the radiation source directs the radiation to the radiation detector; and
hold the thermal sensor such that the field of view of the thermal sensor at least partially overlaps the projection field of the radiation;
wherein the frame comprises a first section configured to hold the radiation detector and a second section configured to hold the radiation source and hold the thermal sensor such that the field of view of the thermal sensor at least partially overlaps the projection field of the radiation, wherein the first section and the second section of the frame are separately manipulable; and a computing device configured to:
  control the radiation source;
  receive the digital images from the radiation detector;
  receive the thermal images from the thermal sensor; and
  output the digital images and the thermal images, in real-time, to a display device.

* * * * *